(12) United States Patent
Rogers et al.

(10) Patent No.: US 12,079,230 B1
(45) Date of Patent: Sep. 3, 2024

(54) COMPUTER NETWORK ARCHITECTURE AND METHOD FOR PREDICTIVE ANALYSIS USING LOOKUP TABLES AS PREDICTION MODELS

(71) Applicant: Clarify Health Solutions, Inc., San Francisco, CA (US)

(72) Inventors: Phillip H. Rogers, San Francisco, CA (US); Jonathan B. Ward, San Francisco, CA (US); Rashmi Poudel, San Francisco, CA (US); Emily Barry, San Francisco, CA (US); Melinda Sue Gomez Tellez, San Francisco, CA (US); Prajwal Vijendra, San Francisco, CA (US); Azriel S. Ghadooshahy, San Francisco, CA (US); Emmet Sun, San Francisco, CA (US)

(73) Assignee: Clarify Health Solutions, Inc., San Francisco, CA (US)

( * ) Notice: Subject to any disclaimer, the term of this patent is extended or adjusted under 35 U.S.C. 154(b) by 0 days.

(21) Appl. No.: 18/428,964

(22) Filed: Jan. 31, 2024

(51) Int. Cl.
*G06F 16/2457* (2019.01)
*G06F 16/22* (2019.01)

(52) U.S. Cl.
CPC .... *G06F 16/24578* (2019.01); *G06F 16/2282* (2019.01)

(58) Field of Classification Search
None
See application file for complete search history.

(56) References Cited

U.S. PATENT DOCUMENTS

| | | |
|---|---|---|
| 6,381,576 B1 | 4/2002 | Gilbert |
| 6,687,685 B1 | 2/2004 | Sadeghi |
| 7,685,000 B1 | 3/2010 | Petit |
| 7,809,585 B1 | 10/2010 | Ghouri |
| 7,917,377 B2 | 3/2011 | Rao |
| 8,412,537 B1 | 4/2013 | Fenton |
| 8,489,412 B1 | 7/2013 | Gliklich |
| 8,508,336 B2 | 8/2013 | Giobbi |
| 8,732,096 B1 | 5/2014 | Glukhov |

(Continued)

FOREIGN PATENT DOCUMENTS

| | | |
|---|---|---|
| CN | 101689220 | 3/2010 |
| EP | 3471107 | 4/2019 |

(Continued)

OTHER PUBLICATIONS

Sheth et al., Active Semantic Electronic Medical Records, 5th Int'l Semantic Web Conference, Athens, GA, Nov. 6-Nov. 9, 2006.

(Continued)

*Primary Examiner* — Kim T Nguyen
(74) *Attorney, Agent, or Firm* — Akerman LLP; Stephen C. Glazier

(57) ABSTRACT

Embodiments in the present disclosure relate to computer network architectures and methods for predictive analysis using lookup tables as prediction models. The predictive analysis, including the generation of the lookup tables, performed by a predictive system of the present disclosure is driven entirely by a query language, such as Structured Query Language, in various embodiments. The predictive analysis, including the generation of the lookup tables, is performed without machine learning or generative artificial intelligence, in various embodiments.

20 Claims, 6 Drawing Sheets

(56) References Cited

U.S. PATENT DOCUMENTS

| | | | |
|---|---|---|---|
| 8,805,759 | B1 | 8/2014 | Cha |
| 9,002,719 | B2 | 4/2015 | Tofte |
| 9,087,294 | B2 * | 7/2015 | Kojaku .................... G06N 5/02 |
| 9,195,732 | B2 | 11/2015 | Anderson et al. |
| 9,202,253 | B2 | 12/2015 | Macoviak |
| 9,536,052 | B2 | 1/2017 | Amarasingham |
| 9,607,058 | B1 | 3/2017 | Gupta |
| 9,619,841 | B2 | 4/2017 | DiRienzo |
| 9,953,372 | B1 | 4/2018 | Dziabiak |
| 9,996,666 | B1 | 6/2018 | Wilson |
| 10,102,926 | B1 | 10/2018 | Leonardi |
| 10,127,234 | B1 | 11/2018 | Krishnan |
| 10,262,374 | B2 | 4/2019 | Sultan |
| 10,643,749 | B1 | 5/2020 | Warren |
| 10,643,751 | B1 | 5/2020 | Drouin |
| 10,650,928 | B1 | 5/2020 | Larson |
| 10,726,359 | B1 | 7/2020 | Drouin |
| 10,734,101 | B2 | 8/2020 | Rajan |
| 10,783,998 | B1 | 9/2020 | Perlin |
| 10,811,139 | B1 | 10/2020 | Wang |
| 10,910,107 | B1 | 2/2021 | Larson |
| 10,910,113 | B1 | 2/2021 | Drouin |
| 10,923,233 | B1 | 2/2021 | Wang |
| 10,990,904 | B1 | 4/2021 | Drouin |
| 10,998,104 | B1 | 5/2021 | Warner |
| 11,017,761 | B2 * | 5/2021 | Peng ..................... G10L 25/30 |
| 11,157,808 | B2 | 10/2021 | Wetta |
| 11,238,469 | B1 | 2/2022 | Talvola |
| 11,270,785 | B1 * | 3/2022 | Talvola ................. G16H 50/30 |
| 11,302,426 | B1 | 4/2022 | Winlo |
| 11,527,313 | B1 | 12/2022 | Talvola |
| 11,605,465 | B1 * | 3/2023 | Larson ................... G06N 20/20 |
| 11,621,085 | B1 * | 4/2023 | Gottula ................. G16H 50/50 706/11 |
| 11,625,789 | B1 * | 4/2023 | Drouin ................... G06N 20/00 706/12 |
| 11,636,497 | B1 * | 4/2023 | Talvola ................. G06N 20/20 705/7.29 |
| 11,742,091 | B1 | 8/2023 | Gottula |
| 11,748,820 | B1 | 9/2023 | Drouin |
| 11,763,950 | B1 | 9/2023 | Larson |
| 11,880,368 | B2 * | 1/2024 | Kondiles ........... G06F 16/24556 |
| 11,922,289 | B1 * | 3/2024 | Segars ................ G06N 3/0475 |
| 2002/0087358 | A1 | 7/2002 | Gilbert |
| 2005/0038669 | A1 | 2/2005 | Sachdeva |
| 2005/0137912 | A1 | 6/2005 | Rao |
| 2005/0222867 | A1 | 10/2005 | Underwood |
| 2006/0052945 | A1 | 3/2006 | Rabinowitz |
| 2006/0080139 | A1 | 4/2006 | Mainzer |
| 2006/0161456 | A1 | 7/2006 | Baker |
| 2006/0178915 | A1 | 8/2006 | Chao |
| 2007/0005154 | A1 | 1/2007 | Lancaster |
| 2007/0260492 | A1 | 11/2007 | Feied |
| 2008/0010097 | A1 | 1/2008 | Williams |
| 2008/0120133 | A1 | 5/2008 | Krishnaswami |
| 2008/0146893 | A1 | 6/2008 | Levendowski |
| 2008/0183508 | A1 | 7/2008 | Harker |
| 2008/0201172 | A1 | 8/2008 | McNamar |
| 2009/0006419 | A1 | 1/2009 | Savitsky |
| 2009/0048877 | A1 | 2/2009 | Binns |
| 2009/0192828 | A1 | 7/2009 | Yunker |
| 2009/0206992 | A1 | 8/2009 | Giobbi |
| 2009/0222290 | A1 | 9/2009 | Crowe |
| 2011/0112871 | A1 | 5/2011 | Simonowski |
| 2011/0166883 | A1 | 7/2011 | Palmer |
| 2011/0213625 | A1 | 9/2011 | Joao |
| 2011/0270630 | A1 | 11/2011 | Green, III |
| 2011/0289035 | A1 | 11/2011 | Stojadinovic |
| 2012/0047105 | A1 | 2/2012 | Saigal |
| 2012/0078659 | A1 | 3/2012 | Ashrafzadeh |
| 2012/0179478 | A1 | 7/2012 | Ross |
| 2012/0271612 | A1 | 10/2012 | Barsoum |
| 2012/0310661 | A1 | 12/2012 | Greene |
| 2013/0054259 | A1 | 2/2013 | Wojtusiak |
| 2013/0096937 | A1 | 4/2013 | Campbell |
| 2013/0159023 | A1 | 6/2013 | Srinivas |
| 2013/0179380 | A1 * | 7/2013 | Kojaku ................... G06F 17/18 706/46 |
| 2013/0197936 | A1 | 8/2013 | Willich |
| 2013/0226624 | A1 | 8/2013 | Blessman |
| 2013/0290028 | A1 | 10/2013 | McGuigan |
| 2013/0290037 | A1 | 10/2013 | Hu |
| 2013/0304618 | A1 | 11/2013 | Mastrogiovanni |
| 2014/0046682 | A1 | 2/2014 | Soto |
| 2014/0058755 | A1 | 2/2014 | Macoviak |
| 2014/0058763 | A1 | 2/2014 | Zizzamia |
| 2014/0067406 | A1 | 3/2014 | Hyatt |
| 2014/0081652 | A1 | 3/2014 | Klindworth |
| 2014/0095201 | A1 | 4/2014 | Farooq |
| 2014/0122100 | A1 | 5/2014 | Fillmore |
| 2014/0316810 | A1 | 10/2014 | Oliver |
| 2015/0088541 | A1 | 3/2015 | Yao |
| 2015/0095069 | A1 | 4/2015 | Waljee |
| 2015/0100336 | A1 | 4/2015 | Ford |
| 2015/0127370 | A1 | 5/2015 | Comelis |
| 2015/0213223 | A1 | 7/2015 | Amarasingham |
| 2015/0213225 | A1 | 7/2015 | Amarasingham |
| 2015/0242583 | A1 | 8/2015 | Edson |
| 2015/0261922 | A1 | 9/2015 | Nawana |
| 2015/0302178 | A1 | 10/2015 | Patel |
| 2015/0347705 | A1 | 12/2015 | Simon |
| 2016/0048766 | A1 | 2/2016 | McMahon |
| 2016/0048780 | A1 | 2/2016 | Sethumadhavan |
| 2016/0063212 | A1 | 3/2016 | Monier |
| 2016/0071171 | A1 | 3/2016 | Cancelliere |
| 2016/0078578 | A1 | 3/2016 | Tumma |
| 2016/0092641 | A1 | 3/2016 | Delaney |
| 2016/0098533 | A1 | 4/2016 | Jackson |
| 2016/0132646 | A1 | 5/2016 | Jones |
| 2016/0154937 | A1 | 6/2016 | Hennenfent |
| 2016/0171177 | A1 | 6/2016 | Caffarel |
| 2016/0196398 | A1 | 7/2016 | Vivero |
| 2016/0328526 | A1 | 11/2016 | Park |
| 2017/0006135 | A1 | 1/2017 | Siebel |
| 2017/0017760 | A1 | 1/2017 | Freese |
| 2017/0029894 | A1 | 2/2017 | Damask |
| 2017/0053080 | A1 | 2/2017 | Geppert |
| 2017/0100213 | A1 | 4/2017 | Kuo |
| 2017/0103180 | A1 | 4/2017 | Jiao |
| 2017/0103181 | A1 | 4/2017 | Czerska |
| 2017/0161439 | A1 | 6/2017 | Raduchel |
| 2017/0169173 | A1 | 6/2017 | Snow, Jr. |
| 2017/0236063 | A1 | 8/2017 | Dorris |
| 2017/0249434 | A1 | 8/2017 | Brunner |
| 2017/0270257 | A1 | 9/2017 | St. Clair |
| 2017/0293722 | A1 | 10/2017 | Valverde, Jr. |
| 2017/0308650 | A1 | 10/2017 | Brill |
| 2017/0308652 | A1 | 10/2017 | Ligon |
| 2017/0308981 | A1 | 10/2017 | Razavian |
| 2017/0351821 | A1 | 12/2017 | Tanner |
| 2017/0372028 | A1 | 12/2017 | Zhou |
| 2018/0011976 | A1 | 1/2018 | Lewis |
| 2018/0025126 | A1 | 1/2018 | Barnard |
| 2018/0060521 | A1 | 3/2018 | Connolly |
| 2018/0060744 | A1 | 3/2018 | Achin |
| 2018/0089376 | A1 | 3/2018 | Tucker |
| 2018/0137247 | A1 | 5/2018 | Bore |
| 2018/0182475 | A1 | 6/2018 | Cossler |
| 2018/0211727 | A1 | 7/2018 | Zarkoob |
| 2018/0268320 | A1 | 9/2018 | Shekhar |
| 2018/0277246 | A1 | 9/2018 | Zhong |
| 2018/0289387 | A1 | 10/2018 | Khajavi |
| 2018/0321412 | A1 | 11/2018 | Basri |
| 2018/0336638 | A1 | 11/2018 | Dziabiak |
| 2018/0336639 | A1 | 11/2018 | Dziabiak |
| 2018/0336640 | A1 | 11/2018 | Dziabiak |
| 2018/0342323 | A1 | 11/2018 | Shankar |
| 2018/0344215 | A1 | 12/2018 | Ohnemus |
| 2019/0005115 | A1 | 1/2019 | Warrier |
| 2019/0005195 | A1 | 1/2019 | Peterson |
| 2019/0005410 | A1 | 1/2019 | Shekhar |
| 2019/0034590 | A1 | 1/2019 | Oren |
| 2019/0043605 | A1 | 2/2019 | Hegarty |
| 2019/0080416 | A1 | 3/2019 | Smith |

(56) References Cited

U.S. PATENT DOCUMENTS

| | | |
|---|---|---|
| 2019/0172564 A1 | 6/2019 | Chandra |
| 2019/0244683 A1 | 8/2019 | Francois |
| 2019/0272602 A1 | 9/2019 | Ray |
| 2019/0311812 A1 | 10/2019 | Sweeney |
| 2019/0325995 A1 | 10/2019 | Malone |
| 2019/0333636 A1 | 10/2019 | Bennett |
| 2019/0355481 A1 | 11/2019 | Lamb |
| 2020/0005080 A1 | 1/2020 | Cogan |
| 2020/0058403 A1 | 2/2020 | Barrett |
| 2020/0066253 A1* | 2/2020 | Peng ................. G06F 17/18 |
| 2020/0075139 A1 | 3/2020 | Master |
| 2020/0105413 A1 | 4/2020 | Vladimirova |
| 2020/0111545 A1 | 4/2020 | Syeda-Mahmood |
| 2020/0152320 A1 | 5/2020 | Ghazeleh |
| 2020/0152332 A1 | 5/2020 | Yang |
| 2020/0160998 A1 | 5/2020 | Ward |
| 2020/0176119 A1 | 6/2020 | Spagnolo |
| 2020/0211692 A1 | 7/2020 | Kalafut |
| 2020/0227172 A1 | 7/2020 | Perkins |
| 2020/0253547 A1 | 8/2020 | Harris |
| 2020/0258511 A1 | 8/2020 | Barkol |
| 2020/0279635 A1 | 9/2020 | Letterie |
| 2020/0286616 A1 | 9/2020 | Dunn |
| 2020/0293887 A1 | 9/2020 | De Brouwer |
| 2020/0311300 A1 | 10/2020 | Callcut |
| 2021/0076960 A1 | 3/2021 | Fornwalt |
| 2021/0082554 A1 | 3/2021 | Kalia |
| 2021/0193320 A1 | 6/2021 | Shukla |
| 2021/0241905 A1 | 8/2021 | Hoar |
| 2021/0350910 A1 | 11/2021 | Dastmalchi |
| 2021/0391079 A1 | 12/2021 | Clifton |
| 2022/0051773 A1 | 2/2022 | Appelbaum |
| 2022/0414108 A1* | 12/2022 | Strelzoff ............. G06F 16/29 |
| 2023/0236882 A1* | 7/2023 | Satyarthi ............ G06F 9/542 718/103 |
| 2023/0394039 A1* | 12/2023 | Transier ......... G06F 16/24556 |
| 2024/0071598 A1* | 2/2024 | Neumann ............ G16H 10/60 |

FOREIGN PATENT DOCUMENTS

| | | |
|---|---|---|
| WO | 2016094330 | 6/2016 |
| WO | 2016201212 | 12/2016 |
| WO | 2018149397 | 8/2018 |
| WO | 2020089576 | 5/2020 |
| WO | 2021003485 | 1/2021 |

OTHER PUBLICATIONS

Thesmar et al., "Combining the Power of Artificial Intelligence with the Richness of Healthcare Claims Data: Opportunities and Challenges" Mar. 8, 2019, PharmoEconomics, No. 37, pp. 745-752.

Luo et al., "Automating Construction of Machine Learning Models with Clinical Big Data: Proposal Rationale and Methods" Aug. 29, 2017, J Mir Res Protoc, vol. 6, No. 8, pp. 1-18.

Bjarnadottir, Margret Vilborg, "Data-Driven Approach to Health Care: Applications Using Claims Data" Sep. 2008, Doctoral Thesis, MIT, pp. 1-130.

Lix et al., "A Prediction model to estimate completeness of electronic physician claims databases" May 11, 2015, BMJ Open, pp. 1-8.

Bertsimas et al., "Algorithmic Prediction of Health-Care Costs" Dec. 2008, Operations Research, vol. 56, No. 6, pp. 1382-1392.

Xie et al., "Predicting Days in Hospital Using Health Insurance Claims" Jul. 2015, IEEE Journal of Biomedical and Health Informatics, vol. 19, No. 4, pp. 1224-1233.

Hamad et al., "Using 'Big Data' to Capture Overall Health Status: Properties and Predictive Value of a Claims-Based Health Risk Score" May 7, 2015, PLoS One, vol. 10, No. 5, pp. 1-14.

Yen et al., "Association Between Wellness Score from a Health Risk Appraisal and Prospective Medical Claims Costs" Oct. 2003, JOEM, vol. 45, No. 10, pp. 1049-1057.

Sushmita et al., "Population Cost Prediction on Public Healthcare Datasets" May 18-20, 2015, pp. 87-94.

Sears et al., "Predicting work-related disability and medical cost outcomes: A comparison of severity scoring methods" Dec. 28, 2012, Injury, Int J Care Injured, vol. 45, pp. 16-22.

Ramamurthy et al., "A Configurable, Big Data System for On-Demand Healthcare Cost Prediction" 2017, IEEE International Conference on Big Data, pp. 1524-1533.

Layton, "Risk Selection and Risk Adjustment in Competitive Health Insurance Markets" 2014, Doctoral Dissertation, Boston University, pp. 1-179.

Wang, "Competition in the Market of Health Insurance and Health Care Utilization", 2017, Doctoral Dissertation, Boston University, pp. 1-123.

Zou et al., "Regularization and variable selection via the elestic net," J. of the Royal Statistical Soc., Series B (statistical methodology), 67:2, pp. 301-320 (2005).

Jung et al., "Predicting need for advanced illness or palliative care in a primary care population using electronic health record data," J. Biomedical Informatics 92(2019) 103115.

Khalifa et al., "Utilizing health analytics in improving the performance of healthcare services: A case study on a tertiary care hospital," J. of Infection and Public Health (2016) 9, 757-765.

Silverio et al., "Big Health Data and Cardiovascular Diseases: A Challenge for Research, an Opportunity for Clinical Care" Feb. 25, 2019, Frontiers in Medicine, vol. 6, Art 36, pp. 1-10.

Lentz et al., "Prediction of healthcare utilization following an episode of physical therapy for musculoskeletal pain" 2018, BMC Health Services Research, pp. 1-14.

Johnson et al., "Machine Learning and Decision Support in Critical Care" Jan. 19, 2016, Proceedings of the IEEE, vol. 104, No. 2, pp. 444-466.

Akhmetov et al., "Assessing value of innovative molecular diagnostic tests in the concept of predictive, preventative, and personalized medicine" 2015, EPMA Journal, pp. 1-12.

Lipton et al., "Modeling Missing Data in Clinical Time Series with RN Ns" Nov. 11, 2016, Proceedings of Machine Learning for Healthcare.

Liu et al., "Learning Hierarchical Representations of Electronic Health Records for Clinical Outcome Prediction" Mar. 20, 2019.

Nezhad et al., "A Predictive Approach Using Deep Feature Learning for Electronic Medical Records: A Comparative Study" (Jan. 2019), pp. 1-24.

Reyes-Garcia et al., "Evaluation of the Impact of Data Uncertainty on the Prediction of Physiological Patient Deterioration" 2018, IEEE, p. 38595-38606.

Razzaghi et al., "Multilevel Weighted Support Vector Machine for Classification on Healthcare Data with Missing Values" Apr. 7, 2016, pp. 1-20.

Rhon et al., "Leveraging healthcare utilization to explore outcomes from musculoskeletal disorders: methodology for defining relevant variables from a health services data repository" 2018, pp. 1-11.

Jiang et al., "Cost-Sensitive Parallel Learning Framework for Insurance Intelligence Operation," Oct. 10, 2018.

Kanchinadam et al., "Using Discriminative Graphical Models for Insurance Recommender Systems," Dec. 17, 2018, pp. 421-428.

De Brouwer et al., "System and Method with Federated Learning Model for Medical Research Applications" Mar. 11, 2019, U.S. Appl. No. 62/816,880—Don't Have/PTO Document.

Beam et al., "Clinical Concept Embeddings Learned from Massive Sources of Multimodal Medical Data," May 18, 2018, pp. 1-11.

Henckaerts et al., "Tree-based machine learning for insurance pricing", Sep. 11, 2018.

Liu et al., "FADL: Federated-Autonomous Deep Learning for Distributed Electronic Health Record, "Dec. 3, 2018, pp. 1-5.

Huang et al., "ClinicalBERT: Modeling Clinical Notes and Predicting Hospital Readmission," Apr. 10, 2019.

WANG et Xu, "Inpatient2Vec: Medical Representation Learning for Inpatients, "Apr. 18, 2019.

Zhang et al., "MetaPred: Meta-Learning for Clinical Risk Prediction with Limited Patient Electronic Health Records, " May 8, 2019.

(56) References Cited

OTHER PUBLICATIONS

Zhang et al., Patient2Vec: A Personalized Interpretable Deep Representation of the Longitudinal Electronic Health Record, Oct. 25, 2018, pp. 1-14.

Bai et al., "Interpretable Representation Learning for Healthcare via Capturing Disease Progression through Time," Aug. 2018, pp. 43-51.

Fadhil, Ahmed "A Conversational Interface to Improve Medication Adherence: Towards AI Support in Patient's Treatment," 2018.

* cited by examiner

COMPUTER NETWORK ARCHITECTURE AND METHOD FOR PREDICTIVE ANALYSIS USING LOOKUP TABLES AS PREDICTION MODELS

TECHNICAL FIELD

The present disclosure is related generally to computer network architectures, and more specifically, to computer network architectures and methods for predictive analysis using lookup tables (i.e. without the use of machine learning or artificial intelligence (AI)) as prediction models. Various embodiments apply to the healthcare field, or any other data driven industry/field.

BACKGROUND

Predictive analysis may be useful to provide predictions of future events or outcomes based on past events, circumstances, known variables, and underlying assumptions. Such predictions may be helpful, for example, to forecast events such as weather, drive times, and operational life of equipment. Predictive analysis is also applied by businesses to predict inventory needs, facility and personnel performance, and employee retention as well as track and improve efficiencies and monitor change.

Predictive analysis typically includes predictive modeling using machine learning or AI. The use of machine learning or AI for predictive analysis, however, may be deficient.

SUMMARY

The present disclosure is related generally to computer network architectures, and more specifically, to computer network architectures and methods for predictive analysis using lookup tables as prediction models. In various embodiments, the predictive analysis (including the generation of the lookup tables) performed by a predictive system of the present disclosure is driven entirely (or primarily or at least partially) by a query language, such as, for example, Structured Query Language (SQL), MySQL, Assets Query Language (AQL), Datalog, Data Mining Extensions (DMX). As a result, in various embodiments, the predictive analysis is performed without machine learning or generative AI.

Typically, machine learning utilizes linear algebra, which may provide better results with more data, but machine learning model improvements resulting from increased data scale are difficult to predetermine. Additionally, machine learning typically requires a high cost of resources to train machine learning models on very large, yet often very structured datasets. Machine learning can also be challenging to scale from a technical perspective and may not be the best fit when the experimental observations become so numerous that conditional training cannot converge succinctly. That is, machine learning can be costly at scale, have model architectures that are not capable of performing better or balloon in complexity as data is scaled, and create operation in the center of a data workflow that is very sensitive to initial conditions and obfuscates the interpretability of the causes for their predictions.

In contrast to this, in various embodiments, the prediction system of the present disclosure is more efficient, deterministic, and transparent than machine learning, and requires less computer time and resources. Where the machine learning model has a fixed size and number parameters to describe the training data, the prediction system in this disclosure produces models that can grow as the training set grows without having to modify the initial hyperparameter configurations, in various embodiments. As such, the prediction system (and its use of lookup tables, instead of machine learning and/or AI) helps the computer system to get its results in a more efficient way with less computer resources and less time, in various embodiments. As an example of this, since the prediction system can be driven entirely using a query language (e.g., standard ANSI SQL) the operations at scale can be much faster and less expensive than running matrix operations on large datasets on dedicated hardware, such as GPUs. In various embodiments, the prediction system of the present disclosure provides a more stable and cost-effective approach to generating insights. In various embodiments, the prediction system of the present disclosure provides a differentiated approach to generating predictive analytics.

In various embodiments, rather than the entire model being a compressed generalization of the training data (such as may be the case with machine learning), the prediction system uses compression at the independent variable level and simple statistical modeling for computing general outcomes. This approach makes for deterministic predictions of much greater transparency, in various embodiments. Also, any conditions determining goodness of fit are preconfigured, computed in aggregate, and do not necessarily require iteration, which makes this approach extremely fast to compute, and can be performed entirely in SQL, in various embodiments. Lastly, the lookup table model will scale as non-redundant data is added to the training data. This automatic model scaling with training data is not a feature of traditional machine learning approaches.

In various embodiments, the predictive system addresses the issue of automated population analytics and model accuracy scaling in a way that cannot be achieved with machine learning. In various embodiments, the prediction system of the present disclosure generates interrogatable predictions of high fidelity, without compromising efficiency, is deterministic and does not require automated iterative optimization of a loss function, is implemented entirely in SQL because it doesn't require matrix operations, correlates accuracy and precision of the data model to data scale without changing configuration, creates predictions that can include statistics that both represent the cluster's "center" but also the uncertainty in that center (e.g., the standard deviation of a mean, or the median absolute deviation), does not suffer the curse of dimensionality, returns predictive analytics using both normally distributed assumed, and robust statistics simultaneously, or any combination of the preceding.

In various embodiments, the prediction system utilizes one-hot encoding when generating the lookup tables. In various embodiments, the prediction system stops at the one-hot encoded independent variables and uses varying levels of available match resolutions, instead of attempting to create a dense, uniform vector for each one-hot encoded independent variable set.

In various embodiments, the prediction models (in the form of lookup tables) can be used to quickly generate a hierarchical summary of the population and can also be used as a "fingerprint" to compare and contrast sub-populations.

DETAILED DESCRIPTION

Overview

The present disclosure describes a prediction system and a prediction process that produces predictive models, particularly for patient healthcare outcomes regarding for example, cost, quality and patient satisfaction. According to various embodiments, the prediction system and prediction process develops a predictive model in the form of a lookup table. As such, the prediction system and prediction process may be operated and performed without the use of machine learning or generative AI. The prediction system (and its use of lookup tables, instead of machine learning and/or AI) helps the computer system to get its results in a more efficient way with less computer resources and less time, in various embodiments. As an example of this, since the prediction system can be driven entirely using a query language (e.g., standard ANSI SQL), the operations at scale can be much faster and less expensive than running matrix operations on large datasets on dedicated hardware.

In various embodiments, the prediction system and the prediction process may utilize one or more of the predictive models (in the form of lookup tables) to make predictions regarding a specified outcome that is a dependent variable with respect to the predictive model. The prediction system may be provided an input of one or more observed predictor variables upon which the output or response is requested. By executing the prediction process utilizing the input, the prediction system may generate and output the requested response. Thus, based on the presence or occurrence of a known predictor variable, the prediction system and the prediction process may be used to predict a related future event, predict the probability of the future event, or compare results over past events.

Computer Network Architecture

Figure 1:
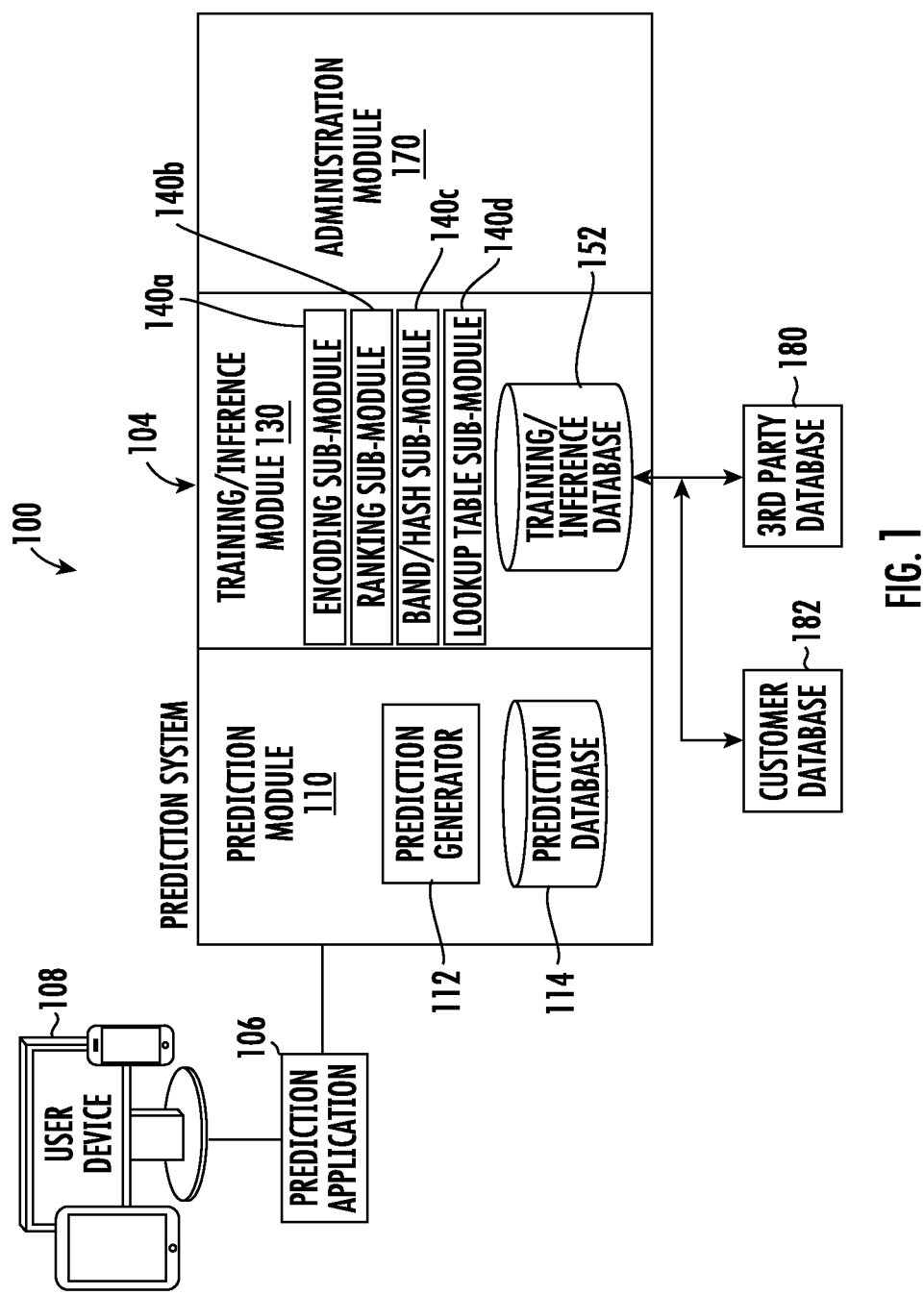
FIG. 1 schematically illustrates a computer network architecture including a prediction system according to various embodiments described herein.

FIG. 1 provides a schematic overview of a flexible computer network architecture 100 according to various embodiments. The network architecture 100 may include a prediction system 104. The prediction system 104 may be configured to generate predictive models in the form of lookup tables, build databases containing multiple predictive models for multiple model types as well as metrics for each model, add new databases to the system, build existing databases integrating new data, update and/or retrain predictive models utilizing new data, receive prediction requests, and generate output responses comprising predictions based on input parameters via the prediction models. In various embodiments, the prediction system 104 may be a query-based prediction system that utilizes query languages (e.g., SQL) to perform one or more of the operations of the prediction system 104. As described in more detail below, the prediction system 104 may include one or more local or distributed hardware units comprising servers, communication devices, data storage devices, and processors configured to execute instructions for performing the operations of the prediction system 104.

Figure 5:
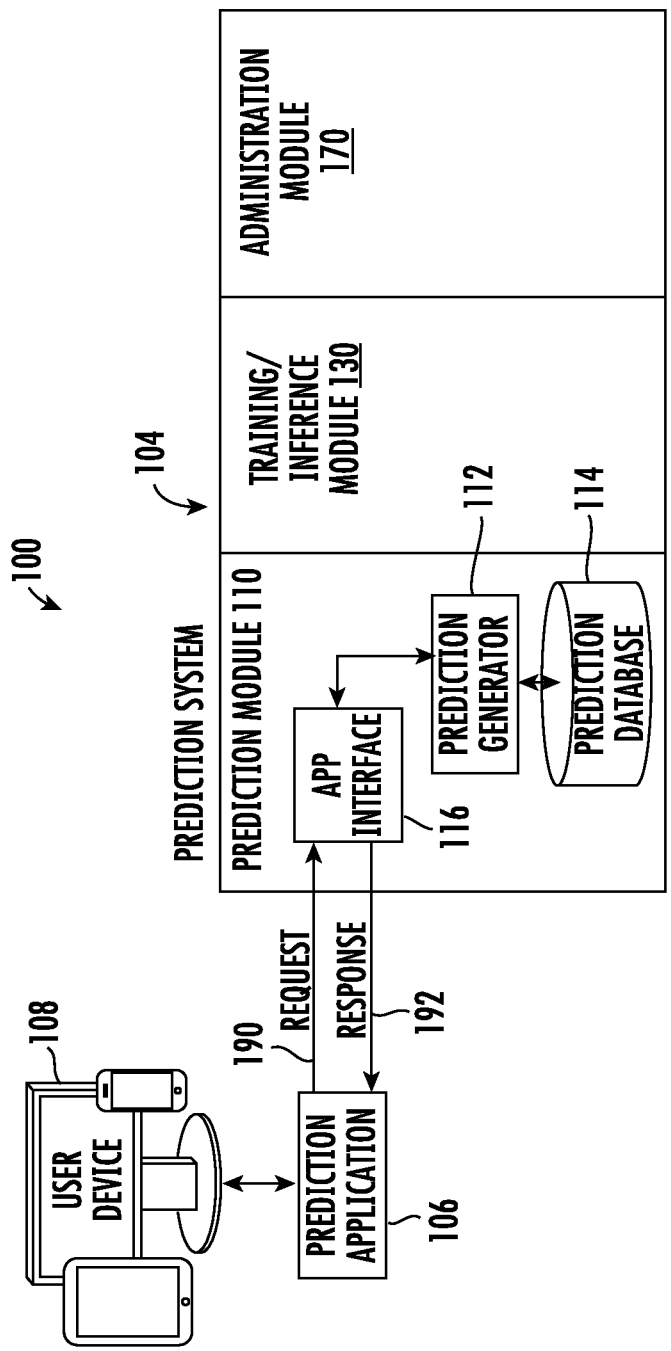
FIG. 5 schematically illustrates various aspects of a computer network architecture including a prediction system according to various embodiments described herein.

The network architecture 100 may also include one or more prediction applications 106. In some embodiments, the prediction application 106 includes one or more web applications. The prediction application 106 (or web applications thereof) may include or access episode request templates for defining prediction requests. Prediction applications 106 may be generic for any end user, semi-generic, or customized for a single end user. The prediction applications 106 (and other web applications) may be thought of as a second layer that operates on top of a first layer that includes the prediction system 104, making requests 190 to the prediction system 104, and receiving responses 192 back. An example of these requests 190 and responses 192 is illustrated in FIG. 5.

In one embodiment, the prediction applications 106 and the prediction system 104 may reside in the cloud and be administered by the operator or user. Prediction applications 106 (or web applications thereof) may be structured for specific users, classes of users, templates or related data and predictions. In the healthcare industry, the prediction applications 106 may seek prediction reports for outcomes of specific patient episodes, and focus on factors such as patient guidance, automated healthcare performance benchmarks, estimates of missing clinical episode costs related to incomplete health insurance claims, patient risk scoring, forecasting episode and annual costs, facilities rating systems adjusted for risk, and other points.

In a healthcare embodiment, when an end user provides a request for a prediction report, the end user may give specific patient data (e.g., patient metrics and treatment) to populate a selected episode profile or template in a selected prediction application 106. The user requests a prediction report, e.g., a prognosis (i.e., predicted outcomes). Other prediction applications 106 may give other reports (e.g., total annual healthcare spend for a primary care physician's patient panel, likelihood of hospital readmission based on patient characteristics, expected hospital length of stay based on patient characteristics and diagnostic indicators, any other report that may improve the quality and efficiency of an individual healthcare provider or a healthcare practice based on a case mix of their patients). The prediction application 106 then automatically accesses the prediction module 110 and transmits the episode data with the request, and receives back a prediction report from the prediction system 104. As one example of this, decision makers at healthcare providers or payers or patients may, for example, receive from the system the prediction report (e.g., an automatically generated and transmitted report), and the decision maker can then respond to this report to pursue higher quality healthcare.

In various embodiments, patient clinical episode-level data, such as dollar cost amounts, and clinical outcomes, such as readmissions, together with all other relevant available information in the embodiment, is aggregated across a large number of healthcare providers, such as hospitals, and from multiple data sources. An embodiment may use forecast models evaluating the most up-to-date information 180, 182, 114, 152 for patients to generate updated forecasts of outcomes (i.e., the risk or probability of the various outcomes), as the patient progresses through the patient episode after discharge from the original caregiver facility. This data may include actual outcomes for completed patient episodes, with projected outcomes of currently evolving and incomplete episodes. Historical data may include information such as patient characteristics, dollar amounts for costs, post-acute care history including dates of admission and discharge from care facilities, and other information.

Prediction applications 106 may be configured to interface one or more user devices 108 with the prediction system 104. The user device 108 may access or run the prediction application 106, which may be stored locally, remotely, or reside in the cloud. For example, the user device 108 may remotely access the prediction application 106 with a browser through a network connection, such as an Internet, extranet, or VPN connection. User devices 108 may include an electronic communication device such as a computer, laptop, PDA, tablet, wearable computing device, or smart phone. The user device 108 will typically function as an end point with respect to the network architecture 100 and interface users with the network architecture 100. Users may include customer or client end users, which may be in a commercial environment such as in a SaaS environment. In an example healthcare application, a user or user device 108 may be associated with a customer or customer grouping, which may be a specific hospital, doctor office, insurance company, or grouping of multiple hospitals, doctor offices, or insurance companies, for example.

The prediction system 104 may include a prediction module 110 and a training/inference module 130. The prediction module 110 may include a prediction generator 112 configured to process prediction requests and generate prediction responses with respect to specified outcomes. For example, prediction requests, which may also be referred to as report requests, may include episode data comprising observed data related to a response variable. The prediction generator 112 may utilize the received episode date with the prediction models (in the form of lookup tables) stored in the prediction database 114, to generate the prediction reports.

The training/inference module 130 may be configured to generate the prediction models in the form of lookup tables. These lookup tables may then be stored in the prediction database 114, in various embodiments. To generate the lookup models, the training/inference module 130 may perform one or more training procedures (an example of which is described below) and one or more inference procedures (an example of which is described below). The training procedures and inference procedures may be performed by various sub-modules included in the training/inference module 130, including, for example, an encoding sub-module 140a, a ranking module 140b, a band/hash sub-module 140c, and a lookup table sub-module 140d.

In various embodiments, the training/inference module 130 may be configured to automatically, such as periodically or upon the occurrence of a system event, generate training requests. For example, system events may include addition of accessible episode data corresponding to specific episodes, such as addition of or updating of data in the training/inference database 152. The training/inference module 130 may generate training requests that include all, multiple, or portions of one, more, or all datasets in the training/inference database 152. In some embodiments, system administrators may submit requests to the training/inference module 130 instead of or in addition to automatic request generation. In various embodiments, the training/inference module 130 may be configured to process training requests and generate predictive models according to the requests. In various embodiments, the training/inference module 130 may generate training requests automatically when new or additional data may be accessed or obtained from a third party database 180 and/or customer database 182. In some instances, all or a portion of the new or additional data may be retained and stored in the training/inference database 152 and thereby expand available episode data for future fine tuning of the predictive models.

The prediction system 104 may include one or more databases, each of which may comprise one or more member databases, for storing episode data, metrics, model types, predictive models in the form of lookup tables, and other data that the prediction system 104 may access to perform system operations. For example, the training/inference module 130 may include a training/inference database 152 that stores observed episode data for training and inferencing the prediction models. The training/inference database 152 may collect and accumulate data over time for use by the training/inference module 130. In a healthcare application, for example, the training/inference database 152 may include data relating to individual patients, episodes, and outcomes. In some embodiments, the training/inference database 152 includes a customer's institutional data, which the training/inference module 130 may access (e.g., from the customer database 182). In one embodiment, the customer's institutional data is restricted to use only for the customer. The training/inference database 152 may also use data from third party databases 180 that may be used by the training/inference module 130 to generate, update, or retrain predictive models. Thus, the training/inference module 130 may access or integrate third party databases 180 or customer databases 182. In some embodiments, the training/inference database 152 includes one or more database repositories for medical data and socioeconomic data such as financial credit histories from credit rating companies. The training/inference database 152 may reside in a single or multiple locations, be local or distributed, and may include third party databases 180 and/or customer databases 182 accessible by the training/inference module 130. In one embodiment, the training/inference database 152 may be divided or physically or logically partitioned into episode specific data libraries.

The third-party databases 180 and/or customer databases 182 may include medical claims data, prescription refill data, publicly available social media data, credit agency data, marketing data, travel website data, e-commerce website data, search engine data, credit card data, credit score and credit history data, lending data, mortgage data, socioeconomic data, financial data, travel data, geolocation data, telecommunications usage data, and other third-party data bases. The third-party databases 180 and/or customer specific databases 182 may be associated with any type of vendor and/or customer, such as, for example, hospitals, medical practices, insurance companies, credit scoring agencies, and credit history agencies. This unique combination of third-party databases 180 and/or customer specific databases 182 gives the system 100 an edge in the quality of the predictive models used and in the forecasts produced. Further embodiments may also use this unique combination of third-party data, further combined with data generated by users 108 of the prediction applications 106, to further enhance the quality of the predictive models and the forecasts produced.

In various embodiments, the network architecture 100 or prediction system 104 may also include an administration module 170. The administration module 170 may be configured to allow system administrators to develop and control the prediction system 104, such as defining episode types. For example, system administrators may define patient episode types such as types of patient conditions to be handled, their metrics, and training/inference databases 152 used. The prediction system 104 may be employed for predictive analysis for any episode type. Episode types may include, for example, "hip and knee replacements under Medicare rules" or "pneumonia under Commercial Insurer" rules. The administration module 170 may provide, incorporate, or update episode type definitions, e.g., types of patients, metrics and parameters, and illness types. The administration module 170 may also allow system administrators to define which training/inference database 152 or prediction database 114 each episode type will use. In some embodiments, system administrators may utilize the administration module 170 to add or integrate additional databases into the training/inference databases 152, which may include third-party databases 180 and/or customer databases 182. In the above or another embodiment, system administrators may utilize the administration module 170 to define which data each patient episode profile type will use. For example, utilizing the administration module 170, system administrators may define which parameters or attributes, such as predictor variables, associated with observed episode data is to be used for generating predictive models or predictions for specific episode types.

In various embodiments, an administrative application may also be used in addition to or instead of an administration module 170. For example, an administer device (not shown) may utilize an administrator application (not shown) to develop, control, or otherwise access the prediction system 104 and its operations. The administrator device may access or run the administrator application, which may be stored locally, remotely, or reside in the cloud. In one embodiment, the administrative application comprises a web application remotely accessible by the administrator device via a browser through a network connection, such as an Internet, extranet, or VPN connection. The administrator device may include an electronic communication device such as a terminal, computer, laptop, PDA, tablet, or smart phone.

Prediction System Training Process

Figure 2:
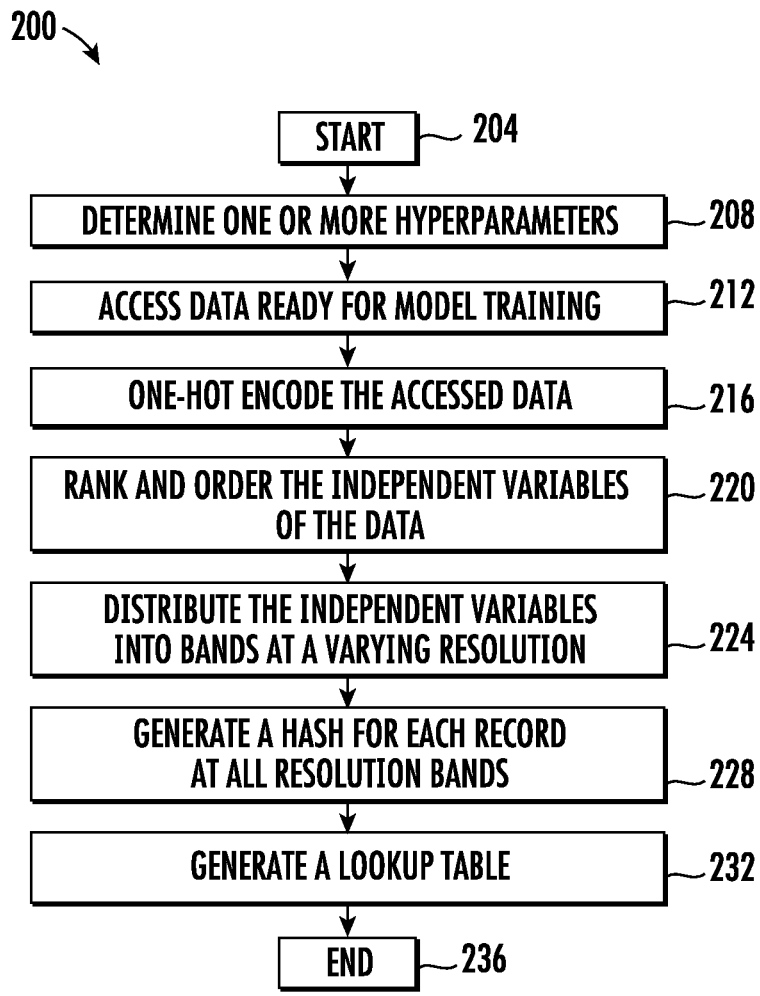
FIG. 2 is a training process of a prediction system according to various embodiments described herein.

FIG. 2 illustrates a training process 200 that may be utilized by the prediction system 104, and more specifically the training/inference module 130 of the prediction system 104 (see, e.g., FIG. 1) to train one or more prediction models, according to various embodiments. Each prediction model is a lookup table, in various embodiments. In some embodiments, the prediction model (in the form of a lookup table) may be an ordered clustering and analytical model.

In various embodiments, one or more (or all) of the steps of the training process 200 is performed using one or more query languages, such as, for example, SQL, MySQL, AQL, Datalog, DMX, any other query language, or any combination of query languages. In the illustrated embodiment, one or more (or all) of the steps of the training process 200 are performed using SQL. In various embodiments, one or more (or all) of the steps of the training process 200 are automatic (i.e., performed without human intervention).

The training process 200 begins at step 204. At step 208, one or more hyperparameters for the training/inference processes are determined. A hyperparameter may refer to a configuration variable that may be used to manage training (and/or inference) of a predictive model. Example hyperparameters that may be determined include minimum band size, band growth function, minimum match volume, any other hyperparameter, or any combination of the preceding.

The minimum band size hyperparameter may refer to the minimum number of independent variables that should be used to match. For example, if set to zero, then the lowest resolution match will be global dependent variable statistics; if the minimum band is size is set to two, then the lowest match resolution allowed for a match will use only 2 independent variables (2 bit resolution). Further examples of the minimum band size hyperparameter are discussed below in further detail.

The band growth function hyperparameter may refer to the function that determines the rate of increase (e.g., a geometric series) in clusters with each incremental band increase. That is, the band growth function hyperparameter determines how to increase the number of independent variables (which may also be referred to as features) for subsequent bands. Moving down the list causes independent variables to become less correlated, in various embodiments. Accordingly, it may be more efficient to include a larger number of independent variables in a band given they are less correlated to the outcome, in various embodiments. Examples of the band growth function hyperparameter are discussed below in further detail.

The minimum match volume hyperparameter may refer to the number of matches that occur in order for a cluster to be deemed worth using in the inference process. In various embodiments, the minimum match volume hyperparameter can be used to balance accuracy, overfitting, and statistical relevance. Examples of the minimum match volume hyperparameter are discussed below in further detail.

A hyperparameter may be determined in any manner at step 208. For example, a hyperparameter may be determined by being input by a user, such as by an administrator via, for example, the administration module 170, or by a user or customer via, for example, the user device 108 and the prediction application 106. In such an example, the hyperparameter may have been input by the user beforehand, or the training process 200 may be momentarily paused until the hyperparameter is input. As another example, a hyperparameter may already be defined, set, or otherwise included (e.g., coded) in the training/inference module 130 (or other portion of the prediction system 104). In such an example, the hyperparameter may be determined automatically when the training process 200 begins. In various embodiments, the hyperparameter may be determined via a query statement, such as a SQL statement.

Any number of hyperparameters may be determined at step 208. For example, one hyperparameter may be determined, two hyperparameters may be determined, three hyperparameters may be determined, five hyperparameters may be determined, or any other number of hyperparameters may be determined. In various embodiments, at least the following three hyperparameters are determined at step 208: (1) the minimum band size hyperparameter, (2) the band growth function hyperparameter, and (3) the minimum match volume hyperparameter.

Following step 208, the training process 200 moves to step 212, where data that is ready for model training is accessed. In various embodiments, the data is accessed via a query statement, such as a SQL statement.

The data may be accessed in any manner. For example, the data may be accessed from the training/inference database 152, the $3^{rd}$ party database 180, the customer database 182, any other database or storage location, or any combination of the preceding.

In various embodiments, the access data includes independent variable(s), and, in some examples, may also include dependent variables, such as, for example, at least one dependent variable. An independent variable may refer to a variable that may explain or predict changes in a dependent variable. Examples of an independent variable include an event, characteristic, or circumstance that may explain or predict changes in a dependent variable. In various embodiments, the independent variable may be a Boolean-type independent variable. Also, in various embodiments, the number of independent variables may be fixed, and have significance in their presence or absence. An independent variable may also be known (or referred to) as a feature, an independent feature, or a predictor variable.

A dependent variable may refer to an outcome or target metric that is being predicted or otherwise determined (or at least attempted to be predicted or otherwise determined). In various embodiments, a dependent variable may also be known (or referred to) as a target metric, a response, or a label. In a healthcare application, an example of a dependent variable may be a normalized cost of healthcare, or a number of days in a treatment facility, etc., while an example of an independent variable may be age of a patient, gender of a patient, treatment type, etc. In a housing application, an example of a dependent variable may be purchase price of a single family home, while an example of an independent variable may be the number of bedrooms, number of bathrooms, location, etc.

In various embodiments, the accessed data is in the form of a table, where all independent and dependent variable(s) (if any) are stored in their own columns or other structures. In various embodiments, the independent variable(s) and dependent variable(s) (if any) are stored in the table as numerical or string types.

Following step 212, the training process 200 moves to step 216, where the accessed data is one-hot encoded. In various embodiments, the accessed data is one-hot encoded by the encoding module 140*a* discussed above. In various embodiments, in order to perform the one-hot encoding, the data (e.g., data in each column of a table) is accessed as a string of data, using, for example, a query statement, such as a SQL statement.

One-hot encoding may refer to a process that converts (or allows for the conversion of) data into "0"s and "1"s (e.g., "false" and "true"). For example, in some embodiments, records in the accessed data may have variables and/or portions that indicate, for example, a gender of a patient. This gender would typically be encoded as "Male", "Female", "Unknown", etc. In order to allow this gender to be converted into "0"s and "1"s, in various embodiments, the one-hot encoding performed at step 216 may increase the number of columns included in the table of data so that, for example, the single column of data (e.g., indicating either "Male", "Female", or "Unknown") is converted into, for example, two separate columns: (1) Male; (2) Female This conversion into two columns may then allow each of those two columns to be filled with either "0"s or "1"s, to indicate whether the record refers to a "Male", a "Female", or "Unknown". For example, the array of entries [1,0] may refer to a Male patient, the array of entries [0,1] may refer to a Female patient, and the array of entries [0,0] may refer to an Unknown gender patient.

The one-hot encoding in step 216 may be performed using any type of one-hot encoding. For example, the one-hot encoding in step 216 may be performed using continuous or discrete binning of numerical values, dummy/indicator assignment for categorical variables, any other one-hot encoding process, or any combination of the preceding. In various embodiments, the one-hot encoding in step 216 is performed using continuous binning, which makes the "1"s in each encoded variable not mutually exclusive, but the same information ends up being encoded. This approach may reduce worry associated with the assumed resolution of the demographic bins. Rather, the feature sorting and matching algorithms determine which are most important at time of fit, in various embodiments. In various embodiments, the one-hot encoding may be fine-tuned, if the results are too coarse.

In various embodiments, the one-hot encoding is performed on one or more of the independent variables included in the accessed data. For example, the one-hot encoding may be performed on all of the independent variables included in the accessed data. In other examples, the one-hot encoding may only be performed on a portion of the independent variables included in the accessed data. As one example of this, some of the independent variables in the accessed data may have been previously one-hot encoded (e.g., before step 216, before the training process 200). That is, some of the independent variables in the accessed data may already be stored as Boolean-types. In such an example, the one-hot encoding performed at step 216 is only performed on all of the remaining independent variables (i.e., the independent variables that were not previously one-hot encoded). This may result in an increase in columns in the table of data for only the independent variables being one-hot encoded during step 216. The previously one-hot encoded variables (and their associated columns) may not be modified during step 216. If all of the independent variables in the accessed data are already one-hot encoded (e.g., they are already stored as Boolean-types), then step 216 is skipped or no one-hot encoding is performed at step 216, in various embodiments.

In various embodiments, the one-hot encoding in step 216 may be performed on both categorical variables and numerical variables. Categorical variables are variables that contain label values rather than numeric values. An example of a categorical variable in the healthcare application are social determinants of health (SDoH) variables like race or housing status. Numerical variable are variables that fall on a floating point or integer scale (e.g., they have a numeric value). An example of a numerical variable in the healthcare application is age.

In many machine learning applications, one-hot encoding was used on categorical variables only. However, as is discussed above, in various embodiments, the one-hot encoding in step 216 may be performed on both categorical variables and numerical variables. To do so, in various embodiments, the one-hot encoding performed at step 216 may convert the data based on both (1) the variable and (2) edges for the variable. The edges may refer to endpoints for particular values of a variable. As one example, the edges of the numerical independent variable of age may follow continuous binning logic and be defined to be, for example, (a) greater than 34, (b) greater than 50, (c) greater than 61, (d) greater than 69, and (e) greater than 78. As another example, the edges of the categorical independent variable may be defined to be, for example, (a) none, (b) home owner, (c) unknown, and (d) renter. In various embodiments, this may result in various arrays, strings, or combinations of "0"s or "1"s for each variable, regardless of whether the variable is a numerical variable or a categorical variable. This array, string, or combination of "0"s and "1"s for each variable may be referred to as a hash. Furthermore, in various embodiments, these hashes may be used to identify patient attributes and clusters (where clusters may also be referred to as cohorts).

In various embodiments, the one-hot encoding performed at step 216 may increase the number of independent variables (also referred to as features) in the table. For example, as is discussed above, the one-hot encoding performed at step 216 may convert the data into 0"s and "1"s based on both (1) the variable and (2) edges for the variable. These edges for the variable may increase the number of independent variable in the table, in various embodiments. As an example of this, as is discussed above, the edges of the numerical independent variable of age may be defined to be, for example, (a) greater than 34, (b) greater than 50, (c) greater than 61, (d) greater than 69, and (e) greater than 78. In such an example, the number of independent variables associated with age may be increased from one (i.e., age) to five: (1) age greater than 34, (2) age greater than 50, (3) age greater than 61, (4) age greater than 69, and (5) age greater than 78.

In various embodiments, the one-hot encoding performed at step 216 may also convert the records of the data into "0"s and "1"s (in addition to converting the data to include additional columns and/or independent variables). In other embodiments, while the one-hot encoding performed at step 216 may convert the data so as to include additional columns and/or independent variables, in some embodiments, it may not actually convert the records of the data into "0"s and "1"s. In such embodiments, this conversion may occur at step 228 below, where a hash is generated for each record.

In various embodiments, the one-hot encoding performed at step 216 creates (or result in the creation of) a new table of data. The new table may be a duplicate of the table of data accessed in step 212, except all of the independent variables may now be one-hot encoded. In other embodiments, the one-hot encoding performed at step 216 may not create a new table. Instead, the one-hot encoding may be performed in the original table accessed in step 212.

In various embodiments, the one-hot encoding performed at step 216 creates a one-hot encoded mapping (or multiple mappings) that is re-used later. For example, as is discussed below, the same (i.e., matching) one-hot encoded mapping created in step 216 is re-used in step 412 (discussed below).

Following step 216, the training process 200 moves to step 220, where the independent variables are ranked and sorted into order based on the rank. In various embodiments, the independent variables are ranked and sorted into order by the ranking module 140b discussed above. In various embodiments, the ranking and sorting of the independent variables may be performed via a query statement, such as a SQL statement. In other embodiments, the ranking and sorting of the independent variables may be performed via a general purpose programming language, such as PYTHON.

The independent variables may be ranked in any manner. In various embodiments, the independent variables may be ranked relative to how critical they are likely to be in predicting a dependent variable. In various embodiments, the independent variables may be ranked by how much information they contain. In various embodiments, the independent variables may be ranked based on the correlation between the independent variable and the dependent variable(s). In various embodiments, the independent variables may be ranked using linear correlation and variable "importance" scaling at the metric level.

In various embodiments, the manner of ranking is based on whether or not a dependent variable (also referred to as a target metric) is known. That is, the manner of ranking may be based on the outcome or target metric that is predicted or otherwise determined. In a healthcare application, an example of a target metric may be a normalized cost of healthcare, or a number of days in a treatment facility, etc. In a housing application, an example of a target metric may be purchase price of a single family home. In various embodiments, the target metric may be known. For example, the target metric may be included in the accessed data, may be input by a user, such as by an administrator via, for example, the administration module, or by a user or customer via, for example, the user device 108 and the prediction application 106. In other embodiments, the target metric may not be known.

In various embodiments, when a target metric is known, the independent variables may be ranked based on a correlation (e.g., linear or rank) between the hash and the target metric. One example of this includes a ranking based on relationship to target. In this example, each independent variable is ranked (e.g., highest to lowest) using its absolute value of linear correlation with the target metric. As another example, a Spearman correlation may be used to rank the independent variables, so as to capture and appropriately scale non-linear effects.

In various embodiments, multiple target metrics may be known. In such embodiments, one of the target metrics may be a primary target metric, while the other target metrics may be secondary target metrics. In these embodiments, the independent variables may be ranked based on a correlation (e.g., linear, non-linear, or rank) between the independent variable and the primary target metric. In various embodiments, when the primary target metric and the secondary target metric(s) are in the same model ready scope (e.g., the same specialty, or episode), the ranking based on the primary target metric may be reused with the secondary target metric(s).

In various embodiments, when a target metric is not known, the independent variables may be ranked in a manner that clusters and sorts the hashes. In such embodiments, the independent variables may be ranked based on information (Shannon) entropy or feature entropy. In various embodiments, the use of information entropy or feature entropy may work well for unsupervised learning/clustering since there is no dependency on a target metric.

As is discussed above, in addition to ranking the independent variables, step 220 further includes sorting the independent variables into order based on the ranking. In various embodiments, the independent variables may be sorted into order based exclusively on the ranking. As one example of this, all of the independent variables may be sorted from highest to lowest based exclusively on the determined rank (e.g., the linear correlation to the target metric). In such an example, independent variables with a higher correlation to the target metric may always be sorted above independent variables with a lower correlation to the target metric, resulting in independent variables with high correlation at the top of the order, and independent variables that do not correlate with the target metric very much at all being at the bottom of the order. In some embodiments, this order defines highest independent variable importance, even when matching at low resolution, versus which independent variables are to be culled first for finding a similar/matching cluster. In other embodiments, additional factors may be used to sort the independent variables (in addition to ranking), such as, for example, independent variables that indicate case-mix complexity and/or that show comorbidity trends that may have some bearing on utilization.

As is discussed above, the sorting of the independent variables into order occurs at step 220. That is, in various embodiments, the sorting is performed before a lookup table is ever generated. Examples of this generation of the lookup table is discussed further below.

In various embodiments, the ranking and sorting of the independent variables at step 220 creates a rank/sort mapping (or multiple mappings) that is re-used later. For example, as is discussed below, the same (i.e., matching) rank/sort mapping created in step 220 is re-used in step 416 (discussed below).

Following step 220, the training process 200 moves to step 224, where the independent variables are distributed into bands at a varying resolution. In various embodiments, the independent variables are distributed into bands at a varying resolution by the band/hash sub-module 140c discussed above. Additionally, in various embodiments, the independent variables may be distributed into bands at the varying resolution via a query statement, such as a SQL statement. In other embodiments the independent variables may be distributed into bands at the varying resolution via a general purpose programming language, such as PYTHON.

The independent variables may be distributed into bands at a varying resolution, in any manner. In various embodiments, this distribution starts with a top band (i.e., band 1) having one or more of the most correlated independent variables. Then, additional bands may be created that add an additional one or more independent variables, until the last band includes all of the independent variables. That is, the step 224 may subdivide the data into bands of increasing match resolutions. This process of distributing the independent variables into bands may be referred to as binning the independent variables into bands or binning the features into bands.

In various embodiments, the independent variables are distributed into bands based on the order of the independent variables (from step 220), and both the minimum band size hyperparameter and the band growth function hyperparameter (from step 208). As is discussed above, the minimum band size hyperparameter may refer to the minimum number of independent variable(s) that should be used to match. Additionally, the band growth function hyperparameter may refer to the function that determines the rate of increase (e.g., a geometric series) in clusters with each incremental band increase. That is, the band growth function hyperparameter determines how to increase the number of independent variables (which may also be referred to as features) for subsequent bands. Moving down the list causes independent variables to become less correlated, in various embodiments.

As is discussed above, in various embodiments, the distribution of independent variable may start with a top band (i.e., band 1) having one or more of the most correlated independent variables. In various embodiments, the number of independent variables included in band 1 is determined based on the minimum band size hyperparameter. For example, if the minimum band size hyperparameter is one, band 1 will only include one independent variable. Similarly, if the minimum band size is four, band 1 will include four independent variables. Additionally, in various embodiments, the identity of the independent variable(s) that are included in band 1 is determined based on both the minimum band size hyperparameter and the order of the independent variables. For example, if the minimum band size is four, band 1 will include the four top-most ranked independent variables (from step 220).

As is discussed above, in various embodiments, after the top band (i.e., band 1), additional bands may be created that add an additional one or more independent variables, until the last band includes all of the independent variables. In various embodiments, the number and identity of independent variables included in an additional band (e.g., band 2, band 3, etc.) is determined based on each of the minimum band size, the band growth function hyperparameter, and the order of the independent variables. For example, if the minimum band growth function hyperparameter is two, that means that the number of independent variables included in a subsequent band will increase by 2 times (i.e., it will double), with all subsequent bands being cumulative of the previous band. As one example of this, if the band growth function hyperparameter is two and the minimum band size is four, the top band (i.e., band 1) will include the four top-most ranked independent variables. Additionally, the next band (i.e., band 2) will include the eight top-most ranked independent variables (i.e., the four independent variables from band 1 along with the next four top-most ranked independent variables). The subsequent band (i.e., band 3) will include the 16 top-most ranked independent variables (i.e., the eight independent variables from band 2 along with the next eight top-most ranked independent variables). The next subsequent band (i.e., band 4) will include the 32 top-most ranked independent variables (i.e., the 16 independent variables from band 3 along with the next 16 top-most ranked independent variables). Following the same pattern, band 5 will include the 64 top-most ranked independent variables, band 6 will include the 128 top-most ranked independent variables, band 7 will include the 256 top-most ranked independent variables, band 8 will include the 512 top-most ranked independent variables, etc., until all of the independent variables are included in a band. In the example above, if there are only 495 ranked features from step 220, band 8 will only have 495 independent variables (i.e., all of the independent variables), as opposed to 512.

In various embodiments, the top band (i.e., band 1) has the least amount of independent variables (e.g., the four top-most ranked independent variables), and thus has the lowest resolution—thereby providing the least specific cluster definition. This resolution increases with each subsequent band. As such, the last band (e.g., band 8 from the example above) has the greatest number of independent variables (e.g., all 495 variables), and thus has the highest resolution—thereby providing the most specific cluster definition(s).

In various embodiments, each band may describe a cluster as a combination of one-hot encoded values for those independent variables includes in the band. For example, band 1 (with 4 independent variables) can have 16 possible combinations of those independent variables. As an example of this, the combination [0, 0, 0, 0] indicates that all of the independent variables in band 1 are "false"; the combination [1,0,0,0] indicates that the first independent variable in band 1 is "true", but the other three are "false"; the combination [1,1,0,0] indicates that the first two independent variables in band 1 are "true", but the other two are "false"; . . . and the combination [1,1,1,1] indicates that all four independent variables in band 1 are "true". Each combination of one-hot encoded values (e.g., [0,0,0,0], or [1,1,1,1] may be referred to as a hash (or an array or a string). Additionally, each hash may refer to a cluster.

In various embodiments, the distribution performed at step 224 creates a distribution mapping (or multiple mappings) that is re-used later. For example, as is discussed below, the same (i.e., matching) distribution mapping created in step 224 is re-used in step 420 (discussed below).

Following step 224, the training process 200 moves to step 228, where a hash is generated for each record at all resolution band levels. In various embodiments, the hashes are generated by the band/hash sub-module 140c. In various embodiments, the hashes are generated via a query statement, such as a SQL statement.

A hash may be generated in any manner. In various embodiments, a hash may be generated by organizing or computing the "0"s and "1"s associated with a record into a hash (or an array, or a string) that can fit (i.e., match the requirements) of one or more bands. In some examples, this may be done for each record at all resolution band levels. That is, each hash resolution may be computed for every record. In other embodiments, a hash may be generated by first converting the record into "0"s and "1"s, and then organizing the "0"s and "1"s associated with a record into a hash (or an array, or a string) that can fit (i.e., match the requirements) of a band. In some embodiments, the hash may be generated for each record at all resolution band levels without a hashing function/table.

Following step 228, the training process 200 moves to step 232, where a lookup table is generated. In various embodiments, the lookup table is generated by the lookup table sub-module 140*d* discussed above. In various embodiments, the lookup table is generated via a query statement, such as a SQL statement.

The lookup table may be generated at step 232 in any manner. In various embodiments, the lookup table is generated based on the hashes (see above). For example, in some embodiments, the lookup table is generated by determining a hash (e.g., [0,1,1,1]) for each record in the accessed data, at each available resolution level (e.g., each available band), and then determining aggregations based on the hashes.

The hash for each record (at each available resolution level) may be determined in any manner. In some embodiments, this may involve finding (or otherwise grouping), for each hash, every record in the accessed data that meets or satisfies the requirement(s) of a particular hash (at each available resolution level). This may be referred to as grouping on the hash.

The aggregations for each hash may refer to calculation(s) made based on the records for each hash (at each available resolution level). In some embodiments, these aggregation(s) for each hash are used as the predicted value(s) for that particular hash.

The aggregations may refer to any type of aggregation (or calculation) that may be made. Examples of aggregations may include median, median absolute deviation (MAD), average, standard deviation (STD), volume (e.g., number of records), any other aggregation (or calculation), or any combination of the preceding.

In some embodiments, the aggregations determined at step 232 are based on whether or not the dependent variable (otherwise referred to as a target metric) is known. In some embodiments, if the dependent variable is not known, only the volume (e.g., number of records) of each hash is calculated (and stored). In some embodiments, if the dependent variable is known, the median, MAD, average, STD, volume (e.g., number of records), any other aggregation (or calculation), or any combination of the preceding, of each hash is calculated (and stored). In such embodiments, the median, MAD, average, STD, and/or any other aggregation (or calculation) is calculated based on the dependent variable (target metric). One or more of these determined aggregations may then be used as a predicted value or uncertainty in the predicted value or cluster/cohort descriptor for the hash, in some embodiments.

As is discussed above, in some embodiments, multiple target metrics may be known. In some embodiments, the aggregation(s) are determined at step 232 for each of these multiple target metrics (e.g., for the primary metric and also for one or more secondary metrics), for each hash. For example, each of the median, MAD, average, STD, and/or volume may be determined for each of the multiple target metrics, for each hash (at each available resolution level). One or more of these determined aggregations are then used as a predicted value for a respective target metric for the hash, in some embodiments.

As is discussed above, one or more of the determined aggregations is used as a predicted value for a respective target metric for the hash (cluster), in some embodiments. In some embodiments, this may create prediction value(s) at each hash/cluster (at each resolution band). For regression models, examples of these prediction value(s) may include median and MAD as the predictions and their uncertainty. For classification models, examples of these prediction value(s) may include average and STD as the predictions and their uncertainty.

The prediction value(s) are then stored in the lookup table at the hash, in some embodiments. Additionally, as is discussed below, these prediction value(s) may be used as a join index at time of inference, in some embodiments.

Figure 3:
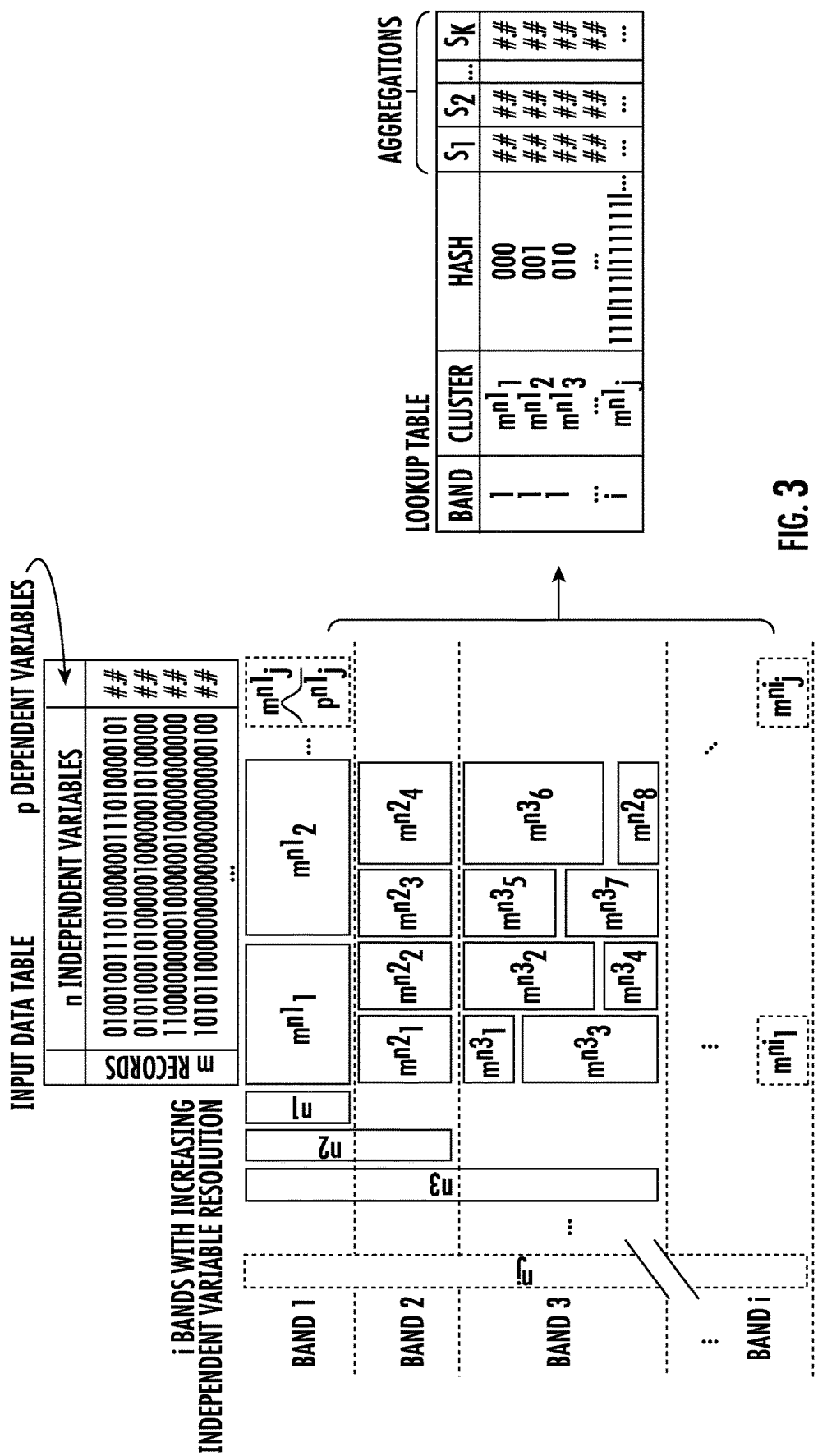
FIG. 3 illustrates the generation of a lookup table according to various embodiments described herein.

One example of the generation of a lookup table (step 232 of training process 200) is illustrated in FIG. 3.

Following step 232, the training process 200 moves to step 236 where the training process 200 ends. Modifications, additions, or omissions may be made to the training process 200. For example, one or more steps of the training process 200 may be optional, or may not be performed. As one example, step 216 may be optional (or may not be performed). As a further example, the steps of the training process 200 may be performed in parallel or in any suitable order.

The training process 200 may be performed any number of times, for any number of sets of data, for any number of independent variable(s), for any number of dependent variable(s) (target metric(s)), or any combination of the preceding. Additionally, the training process 200 and the resulting lookup table may be re-trained. For example, the lookup table can be re-trained to make it better, in various embodiments. The lookup table may be completely rebuilt when a significant amount of new data is collected or if something upstream has changed (e.g., the metric computation is changed). The lookup table can also be updated (incrementally), instead of entirely re-inferenced.

In some embodiments, following the training process 200, the lookup table from the training process 200 and the independent variable ranking/sorting (see step 220) from the training process 200 may be used to perform an inference process 400, an example of which is discussed below.

Prediction System Inference Process

Figure 4:
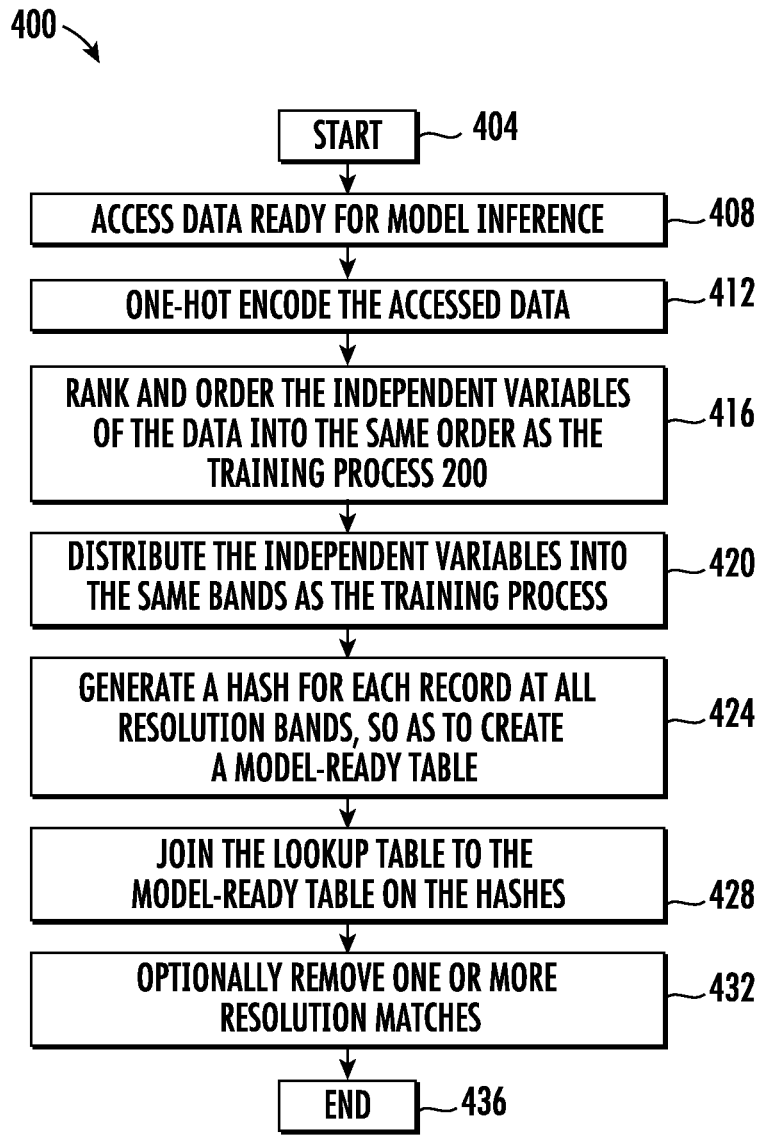
FIG. 4 is an inference process of a prediction system according to various embodiments described herein.

FIG. 4 illustrates an inference process 400 that may be utilized by the prediction system 104, and more specifically the training/inference module 130 of the prediction system 104 (see, e.g., FIG. 1) to inference one or more prediction models, according to various embodiments. As is discussed above, each prediction model is a lookup table, in various embodiments.

In various embodiments, one or more (or all) of the steps of inference process 400 is performed using one or more query languages, such as, for example, SQL, MySQL, AQL, Datalog, DMX, any other query language, or any combination of query languages. In various embodiments, one or more (or all) of the steps of inference process 400 is performed using SQL. In various embodiments, one or more (or all) of the steps of the inference process 400 is automatic (i.e., performed without human intervention).

The inference process 400 starts at step 404. At step 408, data that is ready for model inference is accessed. In various embodiments, the data is accessed via a query statement, such as a SQL statement.

The data may be accessed in any manner. For example, the data may be accessed from the training/inference database 152, the 3$^{rd}$ party database 180, the customer database 182, any other database or storage location, or any combination of the preceding. In various embodiments, the data accessed at step 408 is data that is a hold out from the data accessed at step 212 of the training process 200. In such embodiments, this hold out data may be used to assess the quality of the model. In various embodiments, the data accessed at step 408 is data from a completely different dataset than that of the training process 200. For example, the data accessed at step 408 may be data from, for example, a customer that is in need of predictive analytics provided by the training dataset.

In various embodiments, the accessed data is in the form of a table, where all independent and dependent variable(s) (if any) may be stored in their own columns or other structures. In various embodiments, any column that was used as part of any aggregation (or calculation) in the training process 200 is also included in (or added to) the table of the data accessed in step 408. In various embodiments, the independent variable(s) and dependent variable(s) (if any) may be stored in the table as numerical or string types.

Following step 408, the inference process 400 moves to step 412, where the accessed data is one-hot encoded. In various embodiments, the accessed data is one-hot encoded by the encoding sub-module 140a discussed above.

In various embodiments, the one-hot encoding of step 412 refers to the same one-hot encoding performed in step 216 of the training process 200. For example, in various embodiments, this step involves using the same (i.e., matching) one-hot encoded mapping(s) computed, created, or otherwise used in step 216 of the training process 200. As one example of this, a query statement, such as a SQL statement, is used to look up the one-hot encoded mapping(s) from step 216, and then these mapping(s) are re-used to perform the one-hot encoding of step 412. In various embodiments, in step 412, the same non-one-hot encoded columns in the accessed data are encoded into new one-hot encoded columns.

In various embodiments, the one-hot encoding is performed on one or more of the independent variables included in the accessed data. For example, the one-hot encoding may be performed on all of the independent variables included in the accessed data. In other examples, the one-hot encoding may only be performed on a portion of the independent variables included in the accessed data. As one example of this, some of independent variables in the accessed data may have been previously one-hot encoded. In such an example, the one-hot encoding performed at step 412 is only be performed on all of the remaining independent variables (i.e., the independent variables that were not previously one-hot encoded). This may result in an increase in columns in the table of data for only the independent variables being one-hot encoded during step 412. The previously one-hot encoded variables (and their associated columns) may not be modified during step 412. If all of the independent variables in the accessed data are already one-hot encoded (e.g., they are already stored as Boolean-types), then step 412 is skipped or no one-hot encoding is performed at step 412, in various embodiments.

In various embodiments, the one-hot encoding performed at step 412, as is discussed above, may increase the number of independent variables (also referred to as features) in the table.

In various embodiments, the one-hot encoding performed at step 412 also converts the records of the data into "0"s and "1"s (in addition to converting the data so as to include additional columns and/or independent variables). In other embodiments, while the one-hot encoding performed at step 412 may convert the data so as to include additional columns and/or independent variables, in some embodiments, it may not actually convert the records of the data into "0"s and "1"s. In such embodiments, this conversion occurs at step 420 below, where a hash is generated for each record.

In various embodiments, the one-hot encoding performed at step 412 creates a new table of data. For example, the new table may be a duplicate of the table of data accessed in step 408, except all of the independent variables may now be one-hot encoded. In other embodiments, the one-hot encoding performed at step 412 does not create a new table. Instead, the one-hot encoding may be performed in the original table accessed in step 408.

Following step 412, the inference process 400 moves to step 416, where the independent variables are ranked and sorted into the same order as that of the training process 200. That is, no new ranking needs to be computed, in various embodiments. Instead, in various embodiments, the independent variables are sorted into the same (i.e., matching) order that was used in the training process 200. For example, in various embodiments, this step involves using the same (i.e., matching) rank/sort mapping(s) computed, created, or otherwise used in step 220 of the training process 200. As one example of this, a query statement, such as a SQL statement, is used to look up the rank/sort mapping(s) from step 220, and then these mapping(s) are re-used to perform the ranking and sorting of step 416. In various embodiments, the independent variables are ranked and sorted into order by the ranking module 140b discussed above.

Following step 416, the inference process 400 moves to step 420, where the independent variables are distributed into the same bands as that of the training process 200. That is, no new bands need to be computed, in various embodiments. Instead, in various embodiments, the independent variables are distributed into the same (i.e., matching) bands at the same (i.e., matching) varying resolution that was used in the training process 200. For example, in various embodiments, this step involves using the same (i.e., matching) distribution mapping(s) computed, created, or otherwise used in step 224 of the training process 200. As one example of this, a query statement, such as a SQL statement, is used to look up the distribution mapping(s) from step 224, and then these mapping(s) are re-used to perform the distribution of step 420. In various embodiments, the independent variables are distributed into bands at a varying resolution by the band/hash sub-module 140c discussed above.

Following step 420, the inference process 400 moves to step 424, where a hash is generated for each record at all resolution band levels, so as to create a model-ready table. In various embodiments, the hashes are generated by the band/hash sub-module 140c. In various embodiments, the hashes are generated via a query statement, such as a SQL statement.

A hash may be generated in any manner. In various embodiments, a hash may be generated by organizing or computing the "0"s and "1"s associated with a record into a hash (or an array, or a string) that can fit (i.e., match the requirements) of one or more bands. In some examples, this may be done for each record at all resolution band levels. That is, each hash resolution may be computed for every record. In other embodiments, a hash may be generated by first converting the record into "0"s and "1"s, and then organizing the "0"s and "1"s associated with a record into a hash (or an array, or a string) that can fit (i.e., match the requirements) of a band. In some embodiments, the hash is generated for each record at all resolution band levels without a hashing function/table.

As is mentioned above, the end result of step 424 is the creation of a model-ready table. This model-ready table may be used below.

Following step 424, the inference process 400 moves to step 428, where the lookup table is joined to the model-ready table on the hashes. In various embodiments, the lookup table is joined to the model-ready table by the lookup table sub-module 140*d*. In various embodiments, the lookup table is joined to the model-ready table via a query statement, such as a SQL statement.

The lookup table may be joined to the model-ready table on the hashes in any manner. For example, all or a portion of the lookup table (from the training process 200) may be added to all or a portion of the model-ready table (from the inference process 400) on the hashes (e.g., on matching hashes). As another example, all or a portion of model-ready table (from the inference process 400) may be added to all or a portion of the lookup table (from the training process 200) on the hashes (e.g., on matching hashes). These examples may create a single lookup table, in various embodiments.

In various embodiments, the joining may include joining all or a portion of the predicted value(s) of the lookup table (from the training process 200) to all or a portion of the model-ready table (of the inference process 400) on matching hashes (or vice versa). This may, in some examples, create a (or modify the) single lookup table where the predicted value(s) of the lookup table (from the training process 200) are joined to the model-ready table of the inference process 400 on the matching hashes.

By joining the lookup table to the model-ready table on the hashes, predicted value(s) of the lookup table may be used with all or a portion of the data from the inference process, in various embodiments. In some examples, this can be for benchmark comparisons, or to predict outcomes yet to be measured. In various embodiments, if a dependent variable is not known (unsupervised), a stage could be added where a second lookup table is generated for a new population and used to compare to the reference/training data. That is, the lookup tables may be used to compare populations. One factor that may simplify this comparison of hierarchies is that the same branching bands (tree) topology may be used for training processes 200 and inference processes 400, or subpopulations within the same inference dataset. Comparing different trees may allow for examination of contrasting subpopulations to determine if differences in the populations may be attributed to full population offsets, attributable to a small number of independent variables, or somewhere between, in various embodiments.

Following step 428, the inference process 400 moves to step 432, where one or more resolution matches are removed (if applicable). In various embodiments, the resolution match(es) are removed (if applicable) by the lookup table sub-module 140*d*. In various embodiments, the resolution match(es) are removed via a query statement, such as a SQL statement.

In various embodiments, the one or more resolution matches are removed (if applicable) based on the minimum match volume hyperparameter. As is discussed above, the minimum match volume hyperparameter may refer to the number of matches that occur in order for a cluster to be deemed worth using in the inference process. In various embodiments, the minimum match volume hyperparameter can be used to balance accuracy, overfitting, and statistical relevance.

As one example of this, the minimum match volume hyperparameter may be six. In such an example, if a cluster (hash) has less than six records that match the requirements of that hash, the hash (and its data) may be removed.

Any number of resolutions may be removed at step 432. For example, none of the resolutions may be removed at step 432. As a further example, only the highest resolution band that also meets the minimum match volume hyperparameter may be kept (with all of the lower resolution matches being removed, in some examples).

In various embodiments, step 432 may be optional. For example, instead of performing step 432, only the highest resolution band that also meets the minimum match volume hyperparameter may be utilized. In such an example, the other resolution bands may not be removed. Instead, they are just not utilized.

Following step 432, the inference process 400 moves to step 436 where the inference process 400 ends. Modifications, additions, or omissions may be made to the inference process 400. For example, one or more steps of the inference process 400 may be optional, or may not be performed. As an example of this, step 412 and/or step 432 may be optional (or may not be performed). As a further example, the steps of the inference process 400 may be performed in parallel or in any suitable order.

The inference process 400 may be performed any number of times, for any number of sets of data, for any number of independent variable(s), for any number of dependent variable(s) (target metric(s)), or any combination of the preceding. Additionally, the inference process 400 (and the resulting lookup table) may be re-inferenced. For example, the lookup table can be re-inferenced to make it better, in various embodiments. As an example of this, if the lookup table has been updated by data cleansing or increasing the amount of training, then re-running the inference steps should produce improved results, in various embodiments.

Additionally, the lookup table (prediction model) created by the training process 200 and inference process 400 may be used to provide predictions, in various embodiments. An example of such prediction(s) is discussed below. In various embodiments, when providing predictions, there may be many records that have matches at multiple resolutions. In various embodiments, the highest resolution where the minimum match volume hyperparameter is satisfied is the predicted value for the record.

Prediction Request and Prediction Report

FIG. 5 illustrates operation of the prediction module 110 with respect to processing a prediction request according to various embodiments. An end user may access the prediction system 104 with a user device 108 via a prediction application 106 (a web application) and request a report. In the request, the end user may provide specific episode data, e.g., specific patient data (patient metrics and treatment), to populate a selected episode profile or template in a selected web application associated with the prediction application 106. The web application may be specific to the request report, e.g., a response such as a prognosis or predicted outcome based on the provided episode data. The prediction application 106 may include other web applications that may provide other reports, e.g., possible treatments, probability of each possible result of each choice, economics, or schedule of prognosis and treatment. The web application may then automatically access the prediction system 104 and transmit the episode data with the request, as indicated by arrow 190. The prediction module 110 may include an application interface 116 configured to handle communication between the prediction application 106 and the prediction module 110.

The request may be provided to a prediction generator 112 to generate the requested response. Using the desired response specified in the report request and available episode data, the prediction generator 112 selects the appropriate model (in the form of a lookup table) in the prediction database 114. The prediction generator 112 may then utilize the episode data specified in the request and the selected predictive model in the form of a lookup table, to generate a prediction response for the specified outcome in the request. The prediction module 110 may then provide the requested report including the prediction response, indicated by arrow 192, to the prediction application 106, via the application interface 116, for presentation to the user with the user device 108. In various embodiments, the prediction module 110 may transmit the response to the prediction application 106 for display, storage, or routing to the user device 108 or another location specified by the client user or request.

In various embodiments, any type of report may be requested from the prediction system 104. For example, a report with respect to healthcare applications may be requested from the prediction system 104. As one example of this, a hospital administrator may seek to evaluate the efficiency and quality of primary care physicians (PCP)s within a given practice. For the report, the administrator can specify the PCPs by name and the performance metrics he/she wishes to evaluate upon, and the prediction system 104 would pull performance on each metric for the PCPs' panel of patients to feed into an aggregate performance score for each physician. Each PCP's prediction could be drilled into to understand how attributes of that panel impacted their predicted vs. their actual score (e.g., high concentration of patients with diabetes in their panel).

As another example of this, a healthcare insurance provider may seek to enter a new market and determine which providers will be contracted as in-network providers. The prediction system 104 can generate an aggregated score for each provider in a specified geography based on an algorithm that uses the provider's performance against predictions for key metrics—e.g., annual healthcare spend, count of hospital admissions within patient panel, post-operative complications within patient panel, etc.

While the above report examples are directed to healthcare applications, any other type of report may be requested from the prediction system 104 with respect to any data driven industry/field.

Components of an Architecture

Figure 6:
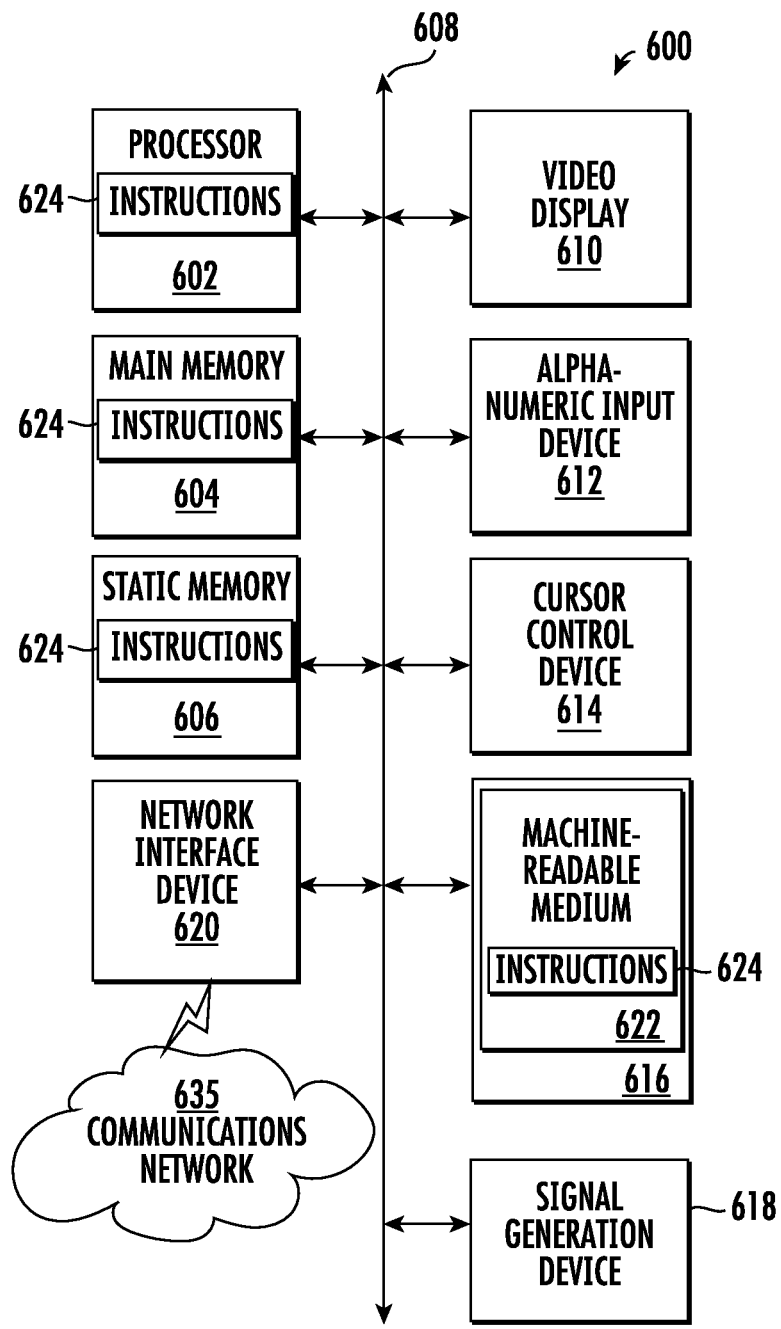
FIG. 6 schematically illustrates components of a system according to various embodiments described herein.

Referring to FIG. 6, at least a portion of the present disclosure may include, or be performed, or otherwise operated on one or more computer apparatuses 600. Such a computer apparatus 600 may comprise a machine such as, but not limited to, a computer system, apparatus, or other arrangement of one or more computing devices within which a set of instructions 624, when executed, may cause the machine to perform any one or more of the methodologies or functions discussed above alone or in conjunction with another one or more additional machines associated with the network or system, e.g., network architecture 100 or prediction system 104 described herein, or another network or system. While a single machine is illustrated in FIG. 6, the term "machine" shall also be taken to include any collection of machines that individually or jointly execute a set (or multiple sets) of instructions 624 to perform any one or more of the methodologies discussed herein. The machine may be configured to facilitate various operations conducted by the system. For example, the machine may be configured to, but is not limited to, assist the network or system by providing processing power to assist with processing loads experienced in the network or system, by providing storage capacity for storing instructions 624 or data traversing the network system, or by assisting with any other operations conducted by or within the network or system.

In some embodiments, the computer apparatus 600 or a machine thereof may operate as a standalone device. In some embodiments, the computer apparatus 600 or a machine thereof may be connected via a communication network 635 to receive assistance from or to assist with operations performed by other apparatuses, machines, or systems. For example, the computer apparatus 600 or a machine thereof may be connected with any component in the network or system. In a networked deployment, the computer apparatus 600 or a machine thereof may operate in the capacity of a server, server stack, or a client, such as a client user machine, in a server-client user network environment, or as a peer machine in a peer-to-peer (or distributed) network environment. The computer apparatus 600 or a machine thereof may comprise a server computer, a client user computer, a personal computer (PC), a tablet PC, a laptop computer, a desktop computer, a control system, a network router, switch or bridge, or any machine capable of executing a set of instructions 624 (sequential or otherwise) that specify actions to be taken by that computer apparatus 600 or a machine thereof. In one example, the computer apparatus 600 comprising one or more machines is arranged to have a distributed architecture employing a suitable model such as a client-server model. In one embodiment, the computer apparatus 600 may include a web service, e.g., service oriented architecture (SOA) or simple object access protocol (SOAP). The computer apparatus 600 may include a software as a service (SaaS) platform. The computer apparatus 600 may include representational state transfer style resources or resource oriented architecture (ROA). The computer apparatus 600 may include one or more processors, servers, databases, networks or network devices, and peripherals configured to obtain and transmit data and initiate operations configured to perform in whole or in part the operations of the system or platform thereof.

The computer apparatus 600 may include a processor 602, e.g., a central processing unit (CPU), a graphics processing unit (GPU, or both), a main memory 604 and a static memory 606, which communicate with each other via a bus 608. The computer apparatus 600 may further include a video display unit 610, which may be, but is not limited to, a liquid crystal display (LCD), a flat panel, a solid state display, or a cathode ray tube (CRT). The computer apparatus 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. For example, the training/inference module 130 described herein may include messaging or queuing processes or functions. Thus, the training/inference module 130 may include Kue library to handle task distribution and coordination between worker process sub-modules, which may be backed by Redis in-memory key-value store with pub/sub. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Other Matters

Dedicated hardware implementations including, but not limited to, application specific integrated circuits, programmable logic arrays and other hardware devices can likewise be constructed to implement the methods/processes described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example network or system is applicable to software, firmware, and hardware implementations.

In accordance with various embodiments of the present disclosure, the processes described herein are intended for operation as software programs running on a computer processor. Furthermore, software implementations can include, but are not limited to, distributed processing or component/object distributed processing, parallel processing, or virtual machine processing that may be constructed to implement the methods/processes described herein.

The present disclosure describes various modules, which may also be referred to as sub-modules, generators, engines, systems, subsystems, components, units, and the like. Such modules may include functionally related hardware, instructions, firmware, or software. Modules may include physical or logical grouping of functionally related applications, services, resources, assets, systems, programs, databases, or the like. Modules or hardware storing instructions or configured to execute functionalities of the modules may be physically located in one or more physical locations. For example, modules may be distributed across one or more networks, systems, devices, or combination thereof. It will be appreciated that the various functionalities of these features may be modular, distributed, and/or integrated over one or more physical devices. While the prediction database 114 as well as the training/inference database 152 are illustrated individually as discrete elements, it will be appreciated that such logical partitions may not correspond to physical partitions of the data. For example, all or portions of the databases may reside or be distributed among one or more hardware locations.

The present disclosure contemplates a machine-readable medium 622 containing instructions 624 so that a device connected to the communications network 635, another network, or a combination thereof, can send or receive voice, video or data, and communicate over the communications network 635, another network, or a combination thereof, using the instructions. The instructions 624 may further be transmitted or received over the communications network 635, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives that is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of the network architecture, systems, and processes that might make use of the structures described herein. While the present disclosure generally describes the inventive network architecture, systems, and processes with respect to healthcare applications, the healthcare field is but only one of many potential applications. Indeed, those having skill in the art will appreciate that the network architecture, systems, and processes described herein may find application in, for example, any data driven industry/field. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the systems and processes of the disclosure. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out the systems and processes of the disclosure, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A computer system, comprising:
one or more memory units comprising one or more instructions;
one or more hardware processors communicatively coupled to the one or more memory units, the one or more hardware processors configured, upon executing the one or more instructions, to:
for each of a plurality of lookup tables:
determine a plurality of hyperparameters, the plurality of hyperparameters comprising a minimum band size hyperparameter, a band growth function hyperparameter, and a minimum match volume hyperparameter;
access a first table that comprises a first set of data, wherein the first set of data comprises a plurality of first independent variables;
one-hot encode one or more of the first independent variables of the plurality of first independent variables of the first set of data, wherein a second table is created that comprises the first set of data with all of the plurality of first independent variables of the first set of data being one-hot encoded;
rank the plurality of first independent variables of the second table, and sort the plurality of first independent variables of the second table into a first order based on the rank, wherein each of the plurality of first independent variables of the second table is ranked based on a linear correlation between the respective first independent variable and a target metric;
distribute the sorted first independent variables of the second table into a plurality of first bands of first varying resolution based on (1) the first order of the sorted first independent variables of the second table, (2) the minimum band size hyperparameter, and (3) the band growth function hyperparameter, wherein the plurality of first bands comprise a top band that comprises a smallest portion of the sorted first independent variables of the second table in comparison to each of the other first bands of the plurality of first bands, wherein the smallest portion of the sorted first independent variables of the second table is defined by the minimum band size hyperparameter, wherein each of the other first bands of the plurality of first bands includes a larger portion of the sorted first independent variables of the second table in comparison to a previous first band of the plurality of first bands, wherein each of the larger portions of the sorted first independent variables of the second table is defined by the band growth function hyperparameter;
generate a first hash for each record of the first set of data of the second table at each level of the plurality of first bands;
generate a respective lookup table of the plurality of lookup tables based on the first hashes, wherein the respective lookup table comprises a grouping of one or more of the records of the first set of data of the second table at each of the first hashes, wherein the respective lookup table further comprises one or more aggregations for each of the first hashes, wherein the respective lookup table further comprises one or more predicted values for each of the first hashes, wherein the one or more predicted values for each of the first hashes comprises at least one of the one or more aggregations for each of the first hashes;
access a third table that comprises a second set of data, wherein the second set of data comprises a plurality of second independent variables;
one-hot encode one or more of the second independent variables of the plurality of second independent variables of the second set of data based on a mapping of the one-hot encoding of all of the plurality of first independent variables of the first set of data, wherein a fourth table is created that comprises the second set of data with all of the plurality of second independent variables of the second set of data being one-hot encoded;
rank and sort the plurality of second independent variables of the fourth table into a second order that is the same as the first order of the sorted first independent variables of the second table;
distribute the sorted second independent variables of the fourth table into a plurality of second bands of a second varying resolution, wherein the distribution of the sorted second independent variables of the fourth table into the plurality of second bands of the second varying resolution is the same as the distribution of the sorted first independent variables of the second table into the plurality of first bands of the first varying resolution, the plurality of second bands of the second varying resolution is the same as the plurality of first bands of the first varying resolution;
generate a second hash for each record of the second set of data of the fourth table at each level of the plurality of second bands, so as to create a model-ready table;
join the respective lookup table to the model-ready table on matching hashes of the first and second hashes; and
remove one or more first bands of the plurality of first bands and/or one or more second bands of the plurality of second bands based on the minimum match volume hyperparameter;
receive a user prediction request from a user device;
generate a prediction report based on one or more lookup tables of the plurality of lookup tables; and
transmit the prediction report to the user device.

2. A system, comprising:
one or more memory units comprising one or more instructions;
one or more processors communicatively coupled to the one or more memory units, the one or more processors configured, upon executing the one or more instructions, to:
for each of one or more lookup tables:
access a table that comprises a first set of data, wherein the first set of data comprises a plurality of first independent variables, wherein all of the plurality of the first independent variables are one-hot encoded;
rank the plurality of first independent variables, and sort the plurality of first independent variables into a first order based on the rank;
distribute the sorted first independent variables of the second table into a plurality of first bands of first varying resolution, wherein the plurality of first bands comprise a top band that comprises a smallest portion of the sorted first independent variables in comparison to each of the other first bands of the plurality of first bands, wherein each of the other first bands of the plurality of first bands includes a larger portion of the sorted first independent variables in comparison to a previous first band of the plurality of first bands;

generate a first hash for each record of the first set of data at each level of the plurality of first bands;

generate a respective lookup table of the one or more lookup tables based on the first hashes, wherein the respective lookup table comprises one or more predicted values for each of the first hashes;

access a table that comprises a second set of data, wherein the second set of data comprises a plurality of second independent variables, wherein all of the plurality of the second independent variables are one-hot encoded;

rank and sort the plurality of second independent variables into a second order that is the same as the first order of the sorted first independent variables;

distribute the sorted second independent variables into a plurality of second bands of a second varying resolution, wherein the distribution of the sorted second independent variables into the plurality of second bands of the second varying resolution is the same as the distribution of the sorted first independent variables into the plurality of first bands of the first varying resolution, wherein the plurality of second bands of the second varying resolution is the same as the plurality of first bands of the first varying resolution;

generate a second hash for each record of the second set of data at each level of the plurality of second bands, so as to create a model-ready table; and join the respective lookup table to the model-ready table on matching hashes of the first and second hashes.

3. The system of claim 2, wherein the one or more processors are further configured, upon executing the one or more instructions, to, for each of the one or more lookup tables, remove one or more first bands of the plurality of first bands and/or one or more second bands of the plurality of second bands based on a minimum match volume hyperparameter.

4. The system of claim 2, wherein the one or more processors are further configured, upon executing the one or more instructions, to:

receive a user prediction request from a user device;

generate a prediction report based on at least one lookup table of the one or more lookup tables; and transmit the prediction report to the user device.

5. The system of claim 4, wherein the user device is a member of a group comprising:

a computer;

a desktop PC;

a laptop PC;

a smart phone;

a tablet computer; and a personal wearable computing device.

6. The system of claim 2, wherein the one or more processors are further configured, upon executing the one or more instructions, to:

one-hot encode one or more of the first independent variables of the plurality of first independent variables of the first set of data, wherein the one-hot encoding results in all of the plurality of the first independent variables being one-hot encoded; and one-hot encode one or more of the second independent variables of the plurality of second independent variables of the second set of data based on a mapping of the one-hot encoding of all of the plurality of first independent variables of the first set of data, wherein the one-hot encoding results in all of the plurality of the second independent variables being one-hot encoded.

7. The system of claim 2, wherein each of the plurality of first independent variables is ranked based on a correlation between the respective first independent variable and a target metric.

8. The system of claim 2, wherein the smallest portion of the sorted first independent variables is defined by a minimum band size hyperparameter.

9. The system of claim 2, wherein each of the larger portions of the sorted first independent variables is defined by a band growth function hyperparameter.

10. The system of claim 2, wherein a last band of the plurality of first bands comprises all of the sorted first independent variables.

11. The system of claim 2, wherein, for each of the one or more lookup tables, the respective lookup table of the one or more lookup tables is generated using one or more query language statements.

12. A method, comprising:

for each of one or more lookup tables:

accessing, by one or more processors of a computing system, a table that comprises a first set of data, wherein the first set of data comprises a plurality of first independent variables, wherein all of the plurality of the first independent variables are one-hot encoded;

ranking, by the one or more processors of the computing system, the plurality of first independent variables, and sorting, by the one or more processors of the computing system, the plurality of first independent variables into a first order based on the rank;

distributing, by the one or more processors of the computing system, the sorted first independent variables of the second table into a plurality of first bands of first varying resolution, wherein the plurality of first bands comprise a top band that comprises a smallest portion of the sorted first independent variables in comparison to each of the other first bands of the plurality of first bands, wherein each of the other first bands of the plurality of first bands includes a larger portion of the sorted first independent variables in comparison to a previous first band of the plurality of first bands;

generating, by the one or more processors of the computing system, a first hash for each record of the first set of data at each level of the plurality of first bands;

generating, by the one or more processors of the computing system, a respective lookup table of the one or more lookup tables based on the first hashes, wherein the respective lookup table comprises one or more predicted values for each of the first hashes;

accessing, by the one or more processors of the computing system, a table that comprises a second set of data, wherein the second set of data comprises a plurality of second independent variables, wherein all of the plurality of the second independent variables are one-hot encoded;

ranking and sorting, by the one or more processors of the computing system, the plurality of second independent variables into a second order that is the same as the first order of the sorted first independent variables;

distributing, by the one or more processors of the computing system, the sorted second independent variables into a plurality of second bands of a second varying resolution, wherein the distribution of the sorted second independent variables into the plurality of second bands of the second varying resolution is the same as the distribution of the sorted first independent variables into the plurality of first bands of the first varying resolution, wherein the plurality of second bands of the second varying resolution is the same as the plurality of first bands of the first varying resolution;

generating, by the one or more processors of the computing system, a second hash for each record of the second set of data at each level of the plurality of second bands, so as to create a model-ready table; and joining, by the one or more processors of the computing system, the respective lookup table to the model-ready table on matching hashes of the first and second hashes.

13. The method of claim 12, further comprising, for each of the one or more lookup tables, removing, by the one or more processors of the computing system, one or more first bands of the plurality of first bands and/or one or more second bands of the plurality of second bands based on a minimum match volume hyperparameter.

14. The method of claim 12, further comprising:
receiving, by the one or more processors of the computing system, a user prediction request from a user device;
generating, by the one or more processors of the computing system, a prediction report based on at least one lookup table of the one or more lookup tables; and
transmitting, by the one or more processors of the computing system, the prediction report to the user device.

15. The method of claim 12, further comprising:
one-hot encoding, by the one or more processors of the computing system, one or more of the first independent variables of the plurality of first independent variables of the first set of data, wherein the one-hot encoding results in all of the plurality of the first independent variables being one-hot encoded; and
one-hot encoding, by the one or more processors of the computing system, one or more of the second independent variables of the plurality of second independent variables of the second set of data based on a mapping of the one-hot encoding of all of the plurality of first independent variables of the first set of data, wherein the one-hot encoding results in all of the plurality of the second independent variables being one-hot encoded.

16. The method of claim 12, wherein, for each of the one or more lookup tables, the ranking, by the one or more processors of the computing system, the plurality of first independent variables comprises ranking each of the plurality of first independent variables based on a correlation between the respective first independent variable and a target metric.

17. The method of claim 12, wherein, for each of the one or more lookup tables, the generating, by the one or more processors of the computing system, the respective lookup table of the one or more lookup tables comprises generating, by the one or more processors of the computing system, the respective lookup table of the one or more lookup tables using one or more query language statements.

18. Tangible, non-transitory computer-readable media comprising program instructions that are configured, when executed, to cause a computing system to perform functions comprising:
for each of one or more lookup tables:
accessing a table that comprises a first set of data, wherein the first set of data comprises a plurality of first independent variables, wherein all of the plurality of the first independent variables are one-hot encoded;
ranking the plurality of first independent variables, and sorting the plurality of first independent variables into a first order based on the rank;
distributing the sorted first independent variables of the second table into a plurality of first bands of first varying resolution, wherein the plurality of first bands comprise a top band that comprises a smallest portion of the sorted first independent variables in comparison to each of the other first bands of the plurality of first bands, wherein each of the other first bands of the plurality of first bands includes a larger portion of the sorted first independent variables in comparison to a previous first band of the plurality of first bands;
generating a first hash for each record of the first set of data at each level of the plurality of first bands;
generating a respective lookup table of the one or more lookup tables based on the first hashes, wherein the respective lookup table comprises one or more predicted values for each of the first hashes;
accessing a table that comprises a second set of data, wherein the second set of data comprises a plurality of second independent variables, wherein all of the plurality of the second independent variables are one-hot encoded;
ranking and sorting the plurality of second independent variables into a second order that is the same as the first order of the sorted first independent variables;
distributing the sorted second independent variables into a plurality of second bands of a second varying resolution, wherein the distribution of the sorted second independent variables into the plurality of second bands of the second varying resolution is the same as the distribution of the sorted first independent variables into the plurality of first bands of the first varying resolution, wherein the plurality of second bands of the second varying resolution is the same as the plurality of first bands of the first varying resolution;
generating a second hash for each record of the second set of data at each level of the plurality of second bands, so as to create a model-ready table; and
joining the respective lookup table to the model-ready table on matching hashes of the first and second hashes.

19. The tangible, non-transitory computer-readable media of claim 18, wherein the program instructions are further configured, when executed, to cause a computing system to perform functions comprising:
receiving a user prediction request from a user device;
generating a prediction report based on at least one lookup table of the one or more lookup tables; and
transmitting the prediction report to the user device.

20. The tangible, non-transitory computer-readable media of claim 18, wherein the program instructions are further configured, when executed, to cause a computing system to perform functions comprising:
- one-hot encoding one or more of the first independent variables of the plurality of first independent variables of the first set of data, wherein the one-hot encoding results in all of the plurality of the first independent variables being one-hot encoded; and
- one-hot encoding one or more of the second independent variables of the plurality of second independent variables of the second set of data based on a mapping of the one-hot encoding of all of the plurality of first independent variables of the first set of data, wherein the one-hot encoding results in all of the plurality of the second independent variables being one-hot encoded.

* * * * *